United States Patent [19]

Tateoka

[11] 4,441,792
[45] Apr. 10, 1984

[54] TELECENTRIC PROJECTION LENSES

[75] Inventor: Masamichi Tateoka, Tokyo, Japan

[73] Assignee: Canon Kabushiki Kaisha, Tokyo, Japan

[21] Appl. No.: 238,412

[22] Filed: Feb. 26, 1981

[30] Foreign Application Priority Data

Mar. 4, 1980 [JP] Japan .................................. 55-27735
Mar. 4, 1980 [JP] Japan .................................. 55-27736

[51] Int. Cl.³ ............................................ G02B 13/22
[52] U.S. Cl. ...................................... 350/415; 350/469; 350/471
[58] Field of Search ................ 350/469, 464, 465, 471, 350/449, 455, 456, 415

[56] References Cited

U.S. PATENT DOCUMENTS 2,685,229 8/1954 Schulz et al. ........................ 350/415
4,093,348 6/1978 Yasukuni .............................. 350/449

Primary Examiner—John K. Corbin
Assistant Examiner—P. M. Dzierzynski
Attorney, Agent, or Firm—Fitzpatrick, Cella, Harper & Scinto

[57] ABSTRACT

Telecentric projection lenses are disclosed which are precise in terms of their F number and which have a high resolving power and high contrast, namely well corrected spherical aberration, coma, curvature of field and distortion, and are intended for use at aperture efficiency of 100% and at magnification of about 1/10. The telecentric projection lens comprises a first lens group consisting of a positive single lens, a second lens group consisting of a negative single lens and a third lens group consisting of two positive lenses, arranged in this order as viewed from the object field side. The lens of the second group is a double concave lens and one of the positive lenses in the third group has a cemented surface whose center of curvature lies on the side of object field. The focal lengths $f_1$, $f_2$ and $f_3$ of the first, second and third groups and the focal length f of the whole lens system satisfy the following conditions:

$$1.69 \leq |f_1/f_2| \leq 2.55$$

$$-0.33 \leq f_2/f \leq -0.19$$

$$0.41 \leq f_3/f \leq 0.59.$$

8 Claims, 44 Drawing Figures

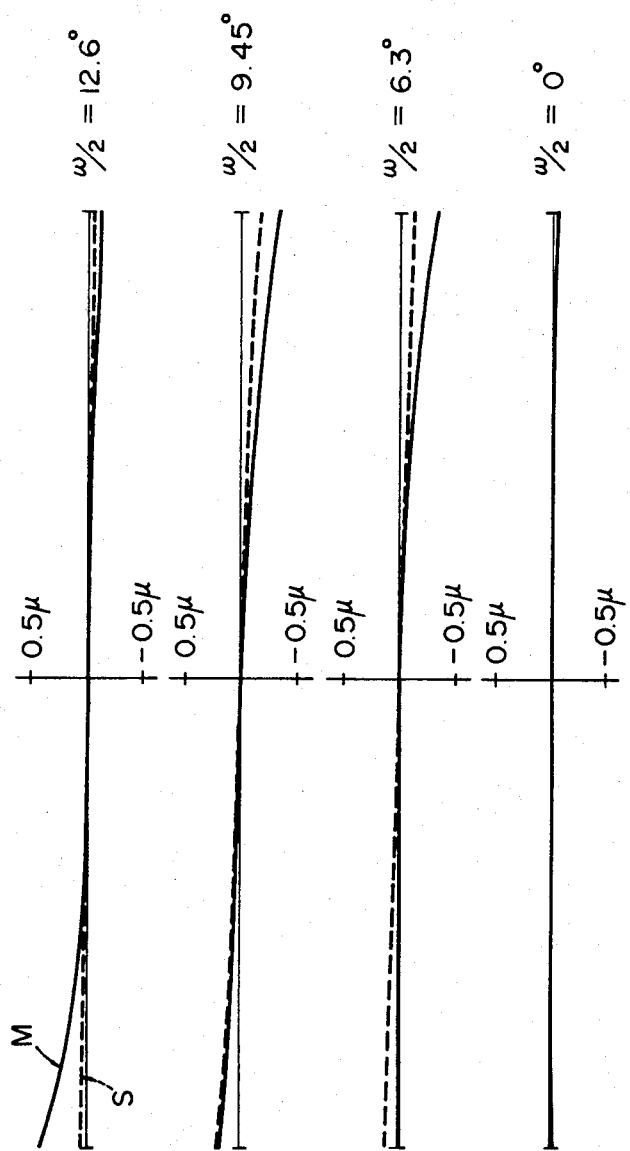
FIG. IC

TELECENTRIC PROJECTION LENSES

BACKGROUND OF THE INVENTION

1. Field of the Invention

The present invention relates to telecentric projection lenses which are intended to use at a magnification of about 1/10 and which are precise in terms of their F number and have their aberrations well corrected.

2. Description of the Prior Art

In recent years there have been developed and used original scanning methods in which solid image pick-up elements are employed as scanning means for reading apparatus with the solid image pick-up elements are arranged in the image plane as scanning photo-receptor elements to scan the original.

To carry out the above known scanning methods, a projection lens must be used to transmit the original image to the solid image pick-up elements and further a color separation prism must be interposed between the projection lens and the focal plane containing the elements to transmit the color signals of the original to the solid image pick-up elements. If a common non-telecentric lens is used as the projection lens in this case, the off-axial rays are obliquely incident upon the color separation prism and shading is caused thereby. To overcome the problem of shading there is used a projection lens having a telecentric property. By using such lens, the principal rays of the incident light pass through the focal point on the side of object field and therefore the principal rays of the exit light including off-axial rays on the side of image field can run in parallel with the optical axis. This is one effective method already known for overcoming the problem of shading caused by the color separation prism.

However, projection lenses useful for carrying out the above scanning method have to satisfy many requirements at the same. In general, such a projection lens has to satisfy the following requirements:

(1) The F number of the lens should be relatively precise. To carry out a high speed scanning employing solid image pick-up elements it is preferable to increase, as much as possible, the quantity of exposure light to the elements per unit time. On the other hand, it is also preferable to use, as an original illumination lamp, a light source whose illumination is as low as possible. For this reason, the projection lens is required to have a relatively precise F number.

(2) For the purpose of reduction in size of the apparatus, namely reduction of the distance between the original surface and the focal plane, the lens should have a wide angle of field.

(3) The lens should have a high resolving power because the size of solid image pick-up element is very small which is in the order of 15μ.

(4) The lens should be suitable for use with its apperture efficiency for off-axis being 100%. This is because the distribution of light intensity must be uniform over all of the solid image pick-up elements.

(5) The lens should be able to project the original surface uniformly. In other words, the distortion of the lens should be of low level.

(6) Since a color separation prism must be interposed between the lens and the solid image pick-up elements, the lens should have a long back focal length.

SUMMARY OF THE INVENTION

Accordingly, it is a general object of the present invention to provide telecentric projection lenses which satisfy the above requirements.

It s a more specific object of the present invention to provide such telecentric lenses which are precise in terms of F number and which have high resolving power, as well as contrast, as the result of well corrected spherical aberration, coma, curvature of field and distortion and which are suitable for use at aperture efficiency of 100% and at a magnification of about 1/10.

To attain the above objects according to the first embodiment of the present invention, there is provided a projection lens which has a pupil located at the focal point on the side of object field of the whole lens system and comprises a first lens or group composed of a positive single lens or lens elements, a second lens or group composed of a double concave single lens and a third lens group or composed of two positive lenses or lens elements arranged in this order as viewed from the object field side, wherein one of the two positive lenses in the third lens group has a cemented surface whose center of curvature lies on the side of object field, and which projection lens is so designed as to satisfy the following conditions:

(1) $1.69 \leq |f_1/f_2| \leq 2.55$ (2) $-0.33 \leq f_2/f \leq -0.19$ (3) $0.41 \leq f_3/f \leq 0.59$ where, $f_1$, $f_2$ and $f_3$ are focal lengths of the first, first lens and the second and third lens groups, respectively, and f is the focal length of the whole system.

The second embodiment of the invention is directed to a projection lens which has a pupil located at the focal point on the side of object field of the whole lens system and comprises a first lens composed of a positive single lens, a second lens group composed of a double concave singal lens and a third lens group composed of three or four lenses, arranged in this order as viewed from the object field side, wherein any one of the lenses in the third group has a cemented surface, and which projection lens is so designed as to satisfy the following conditions:

(1') $1.72 \leq |f_1/f_2| \leq 2.58$ (2') $-0.33 \leq f_2/f \leq -0.19$ (3') $0.41 \leq f_3/f \leq 0.59$ wherein, $f_1$, $f_2$ and $f_3$ are focal lengths of the first lens and the second and third lens groups, respectively, and f is the focal length of the whole system.

Other and further objects, features and advantages of the present invention will appear more fully from the following description with reference to the accompanying drawings.

BRIEF DESCRIPTION OF DRAWINGS

FIG. 1C shows transverse aberrations on Gaussian image plane thereof;

DESCRIPTION OF PREFERRED EMBODIMENTS

Figure 1A:
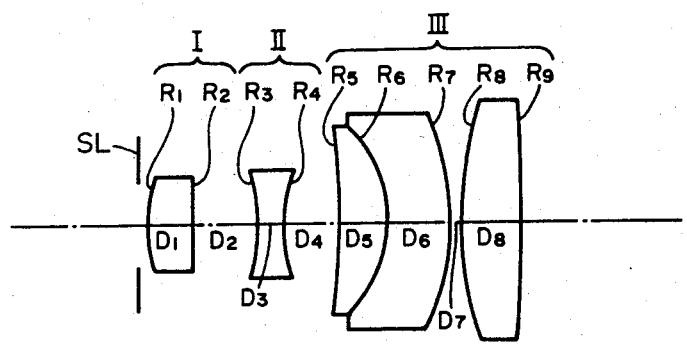
FIG. 1A is a cross-sectional view of the lens described in Example 1.

Initially, there is described conditions (1) to (3) relating to the projection lens according to the first embodiment of the present invention.

By satisfying the condition (1) the spherical aberration can be well corrected while keeping the balance of the refractive powers of the first and second lens groups. The lens of the present invention is used in a telecentric system and the distance between the principal points of the second and third groups is larger than the distance between those of the first and second groups. Therefore, positions at which the paraxial rays pass through the first lens group are greatly spaced apart from the optical axis, which produces a large quantity of spherical aberration.

When $|f_1/f_2|$ is below the lower limit 1.69, then the refractive power of the first group becomes high and the paraxial rays passing through the surface are intensely refracted in the direction toward the optical axis. As the result of it, a large quantity of negative spherical aberration is produced. On the contrary, when $|f_1/f_2|$ exceeds the upper limit of 2.55, the refractive power of the second lens group becomes high and the second group produces such a level of positive spherical aberration which overly compensates the negative spherical aberration produced in the first group.

The condition (2) must be satisfied to correct the curvature of field of the lens system.

When $f_2/f$ is larger than the upper limit, $-0.19$, then Petzval sum is overcompensated and curvature of field is overly currected. To correct it, the refractive power of the second lens group must be increased in absolute value. However, as described hereinafter in connection with the condition (3), if the absolute value of the refractive power of the second group is so increased, then there is produced in the second group a large quantity of distortion which is difficult to correct.

On the contrary, when $f_2/f$ is less than the power limit of $-0.33$, it becomes difficult to correct Petzval sum of the whole system and thereby undercorrection of the curvature of field is caused.

Condition (3) is necessary for correction of the curvature of field and distortion. Since the lens is used in a telecentric system, the positions at which principal rays pass through the third lens group are greatly spaced apart from the optical axis. When $f_3/f$ is smaller than the lower limit of 0.4, the refractive power of the third lens group becomes high and principal rays passing through the third group are intensely refracted in the direction toward the optical axis. Thereby, a large quantity of distortion is produced. On the contrary, if $f_3/f$ is larger than the upper limit of 0.59, then curvature of field becomes worse to the extent that it may be hardly corrected.

Now, the shape of lens according to the first embodiment of the invention is described in detail.

As described above, the lens system of the present invention must be precise in terms of F number. To attain the object, it is most advantageous to effectively correct the spherical aberration of the first lens group which is the group at which paraxial rays are most apart from the optical axis. To this end, the surface of the first lens group on the side of object field is so shaped as to be convexed toward the object field side.

In the lens system of the present invention, the lens group which corrects Petzval sum is only the second group. Therefore, the condition of power to the second group becomes severe. For this reason, the negative lens of the second group is shaped as a double concave lens to reduce aberrations in the second group.

Since a color separation prism is to be interposed between the image plane and the nearest lens surface to the image field, the lens system is required to have a long back focal length. To this end, the third lens group is composed of two positive lenses and is formed in such manner that the air lens formed by the two positive lenses has a shape of double concave lens.

Figure 1B:
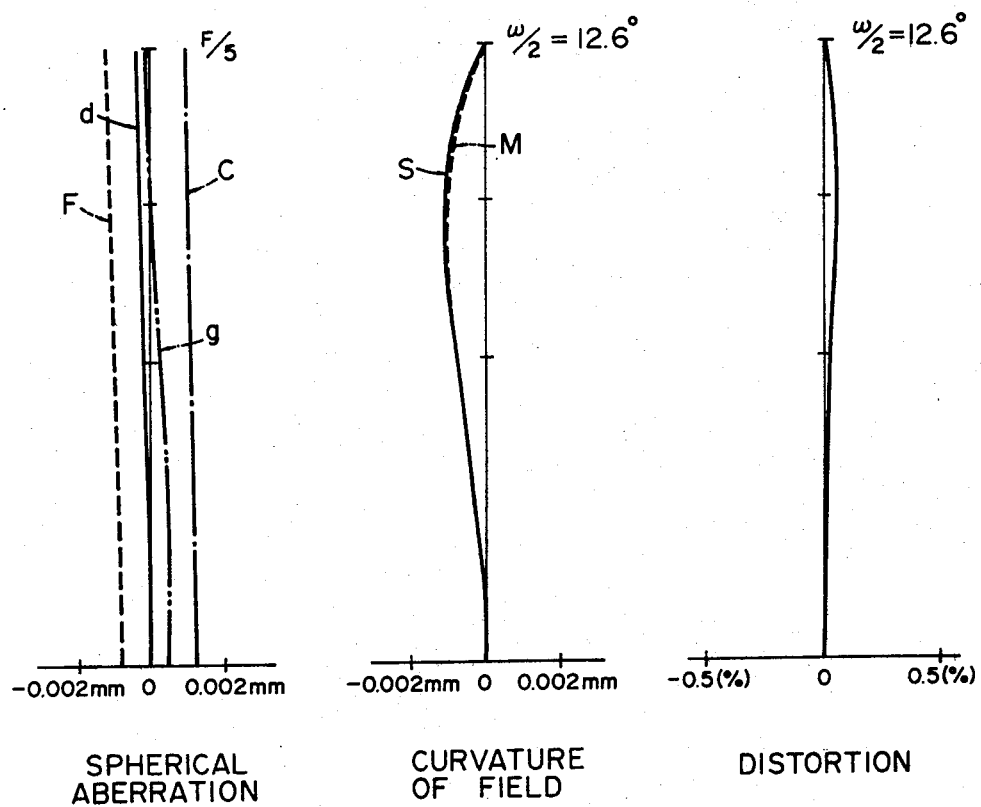
FIG. 1B shows aberrations thereof.
Figure 2A:
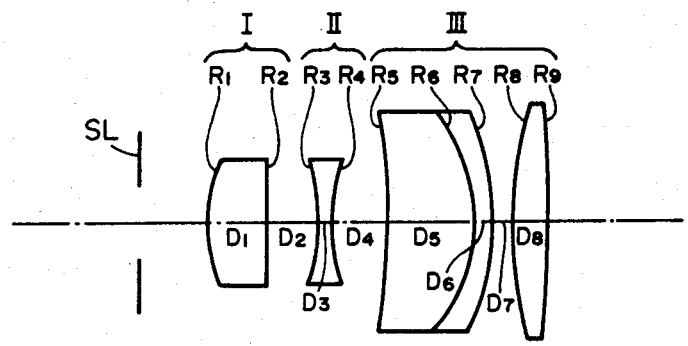
FIG. 2A is a cross-sectional view of Example 2 and FIG. 2B shows aberrations thereof.
Figure 2B:
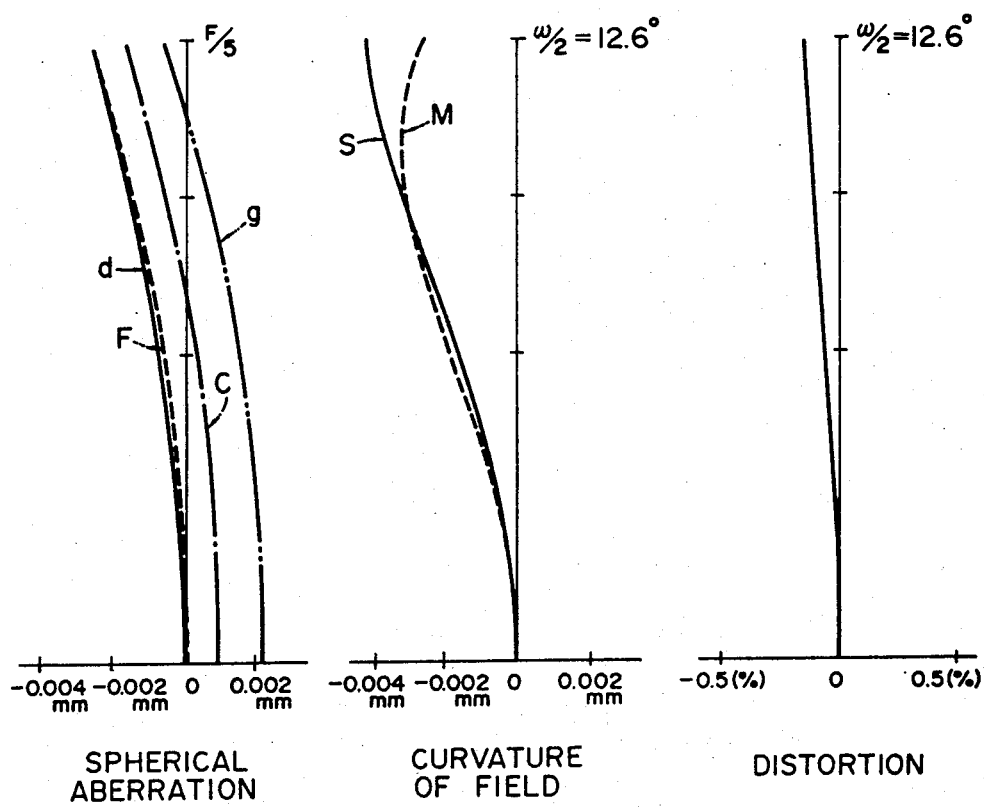
Figure 3A:
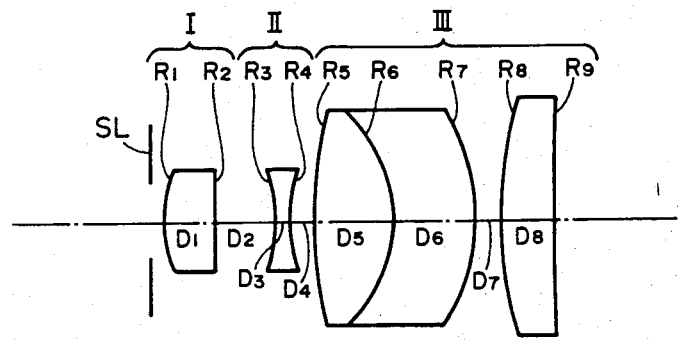
FIG. 3A is a cross-sectional view of Example 3 and FIG. 3B shows aberrations thereof.
Figure 3B:
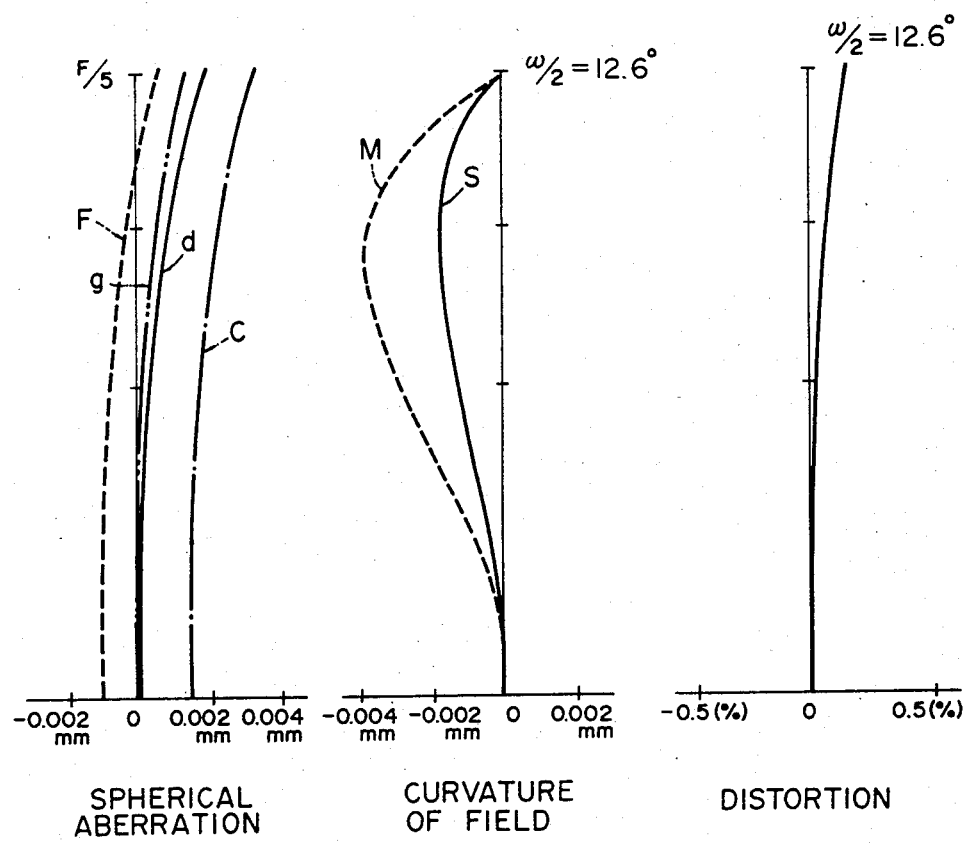
Figure 4A:
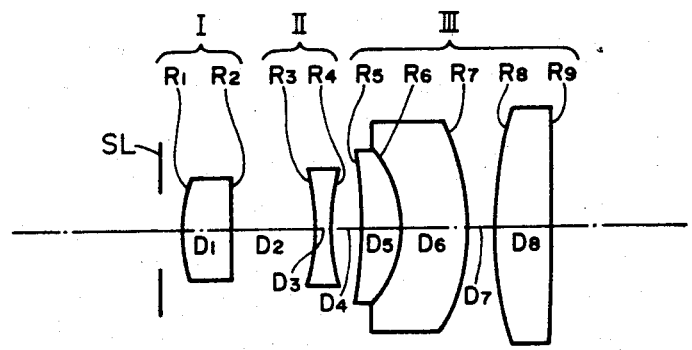
FIG. 4A is a cross-sectional view of Example 4 and FIG. 4B shows aberrations thereof.
Figure 4B:
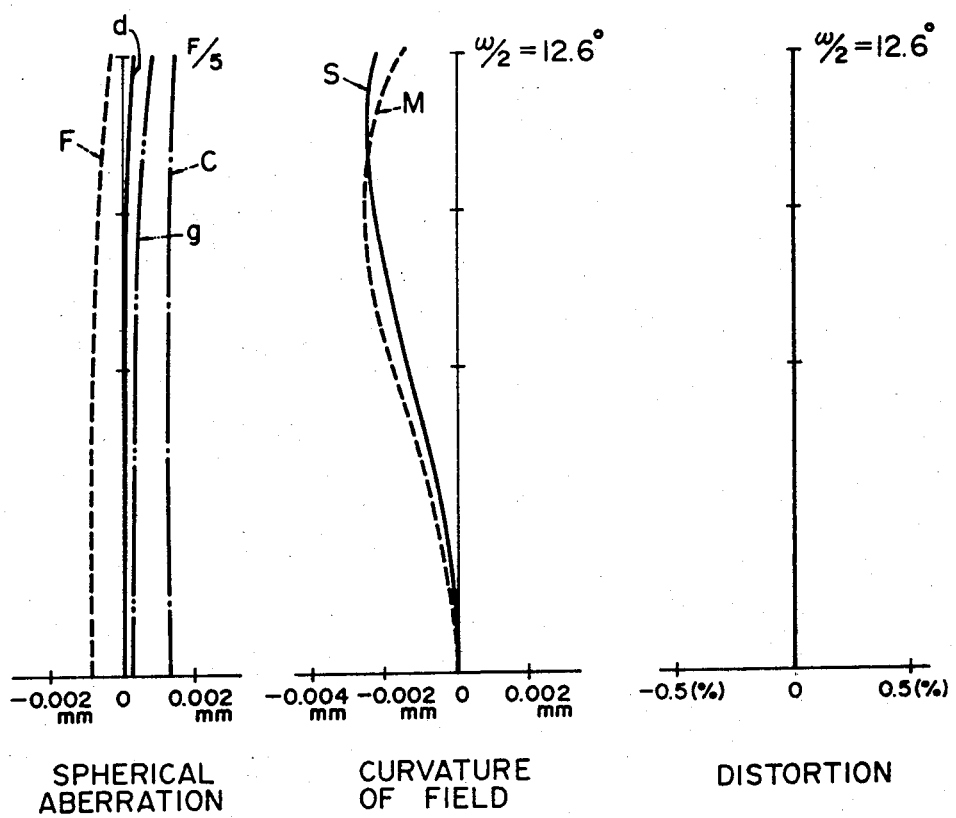
Figure 5A:
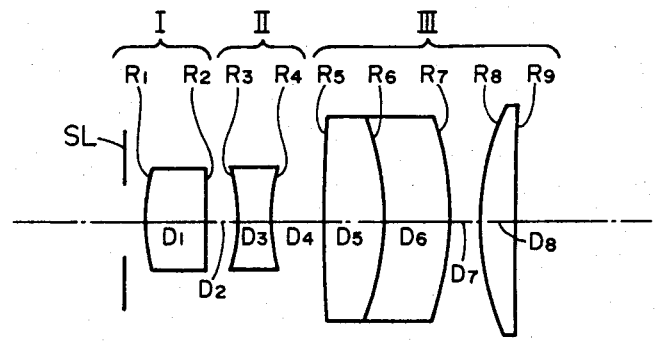
FIG. 5A is a cross-sectional view of Example 5 and FIG. 5B shows aberrations thereof.
Figure 5B:
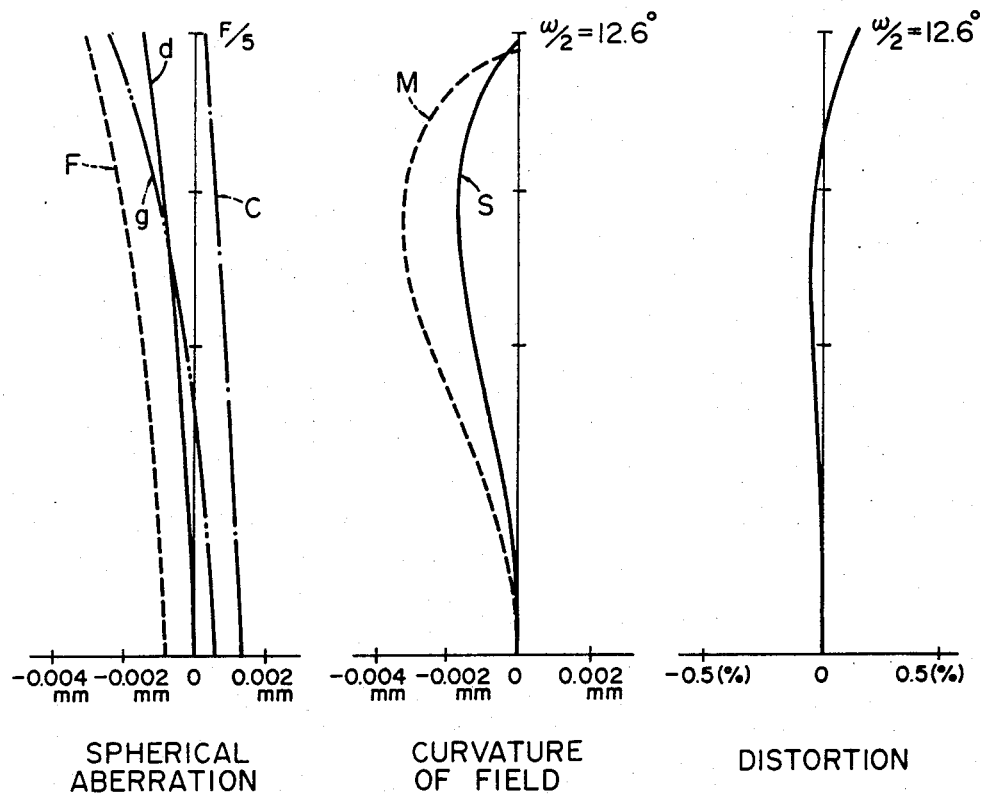
Figure 6A:
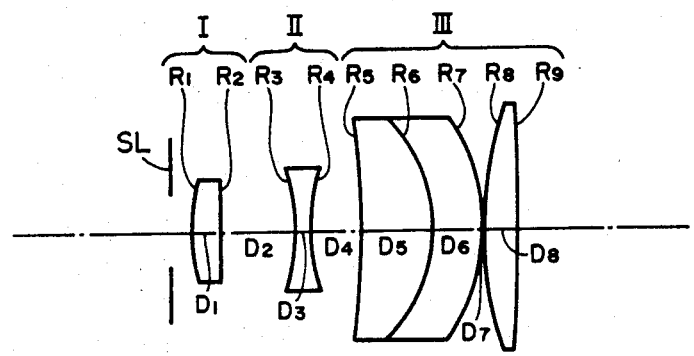
FIG. 6A is a cross-sectional view of Example 6 and FIG. 6B shows aberrations thereof.
Figure 6B:
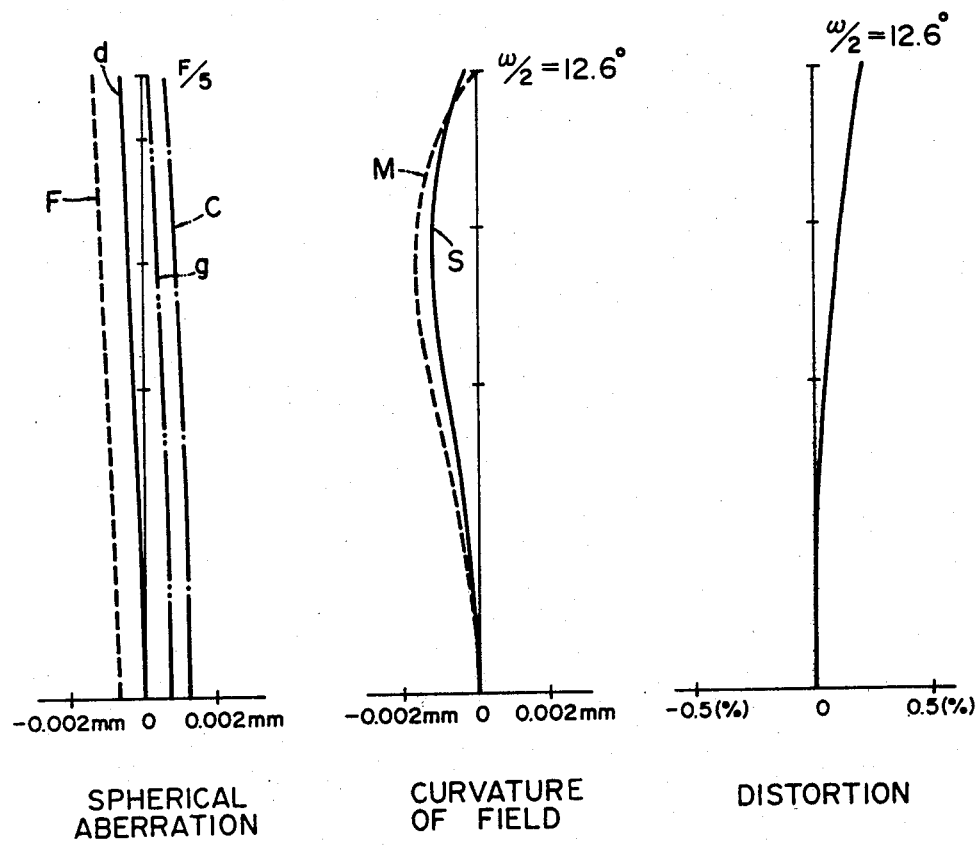
Figure 7A:
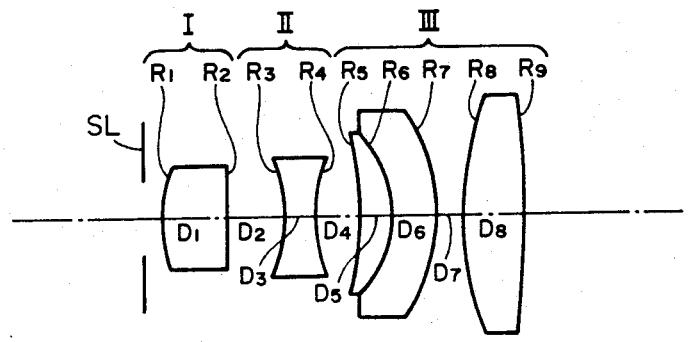
FIG. 7A is a cross-sectional view of Example 7 and FIG. 7B shows aberrations thereof.
Figure 7B:
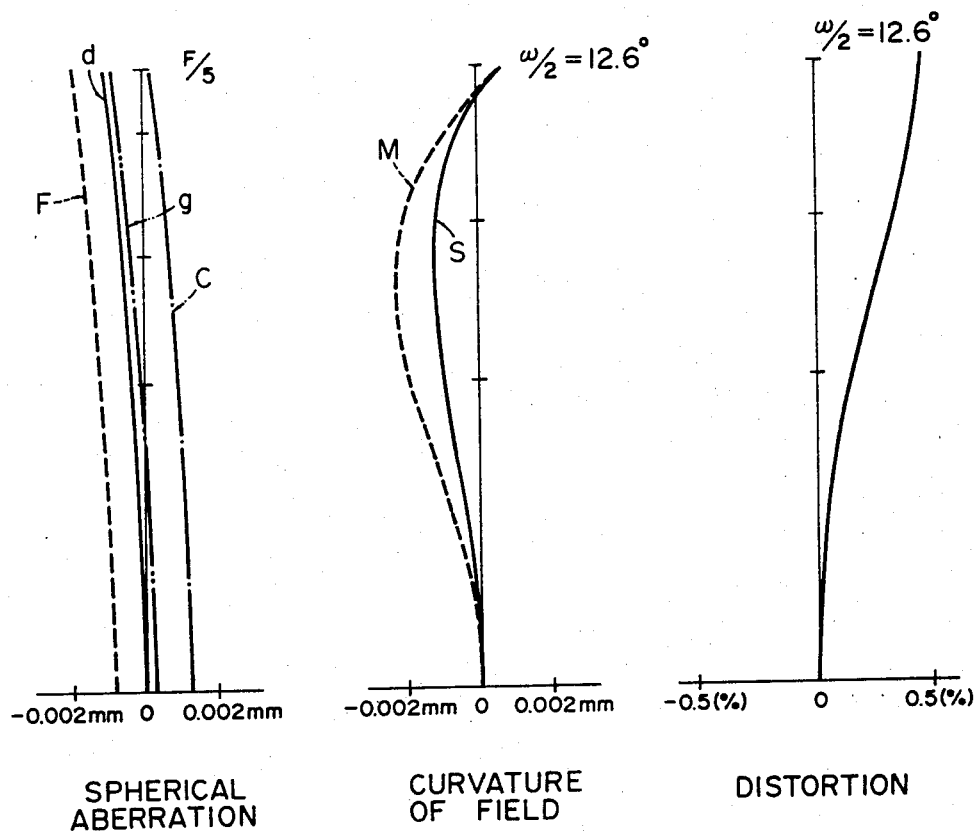
Figure 8A:
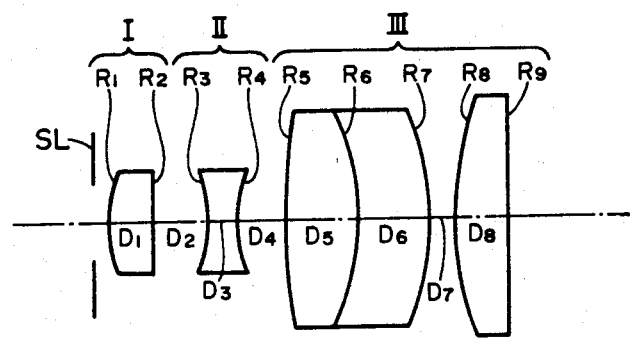
FIG. 8A is a cross-sectional view of Example 8 and FIG. 8B shows aberrations thereof.
Figure 8B:
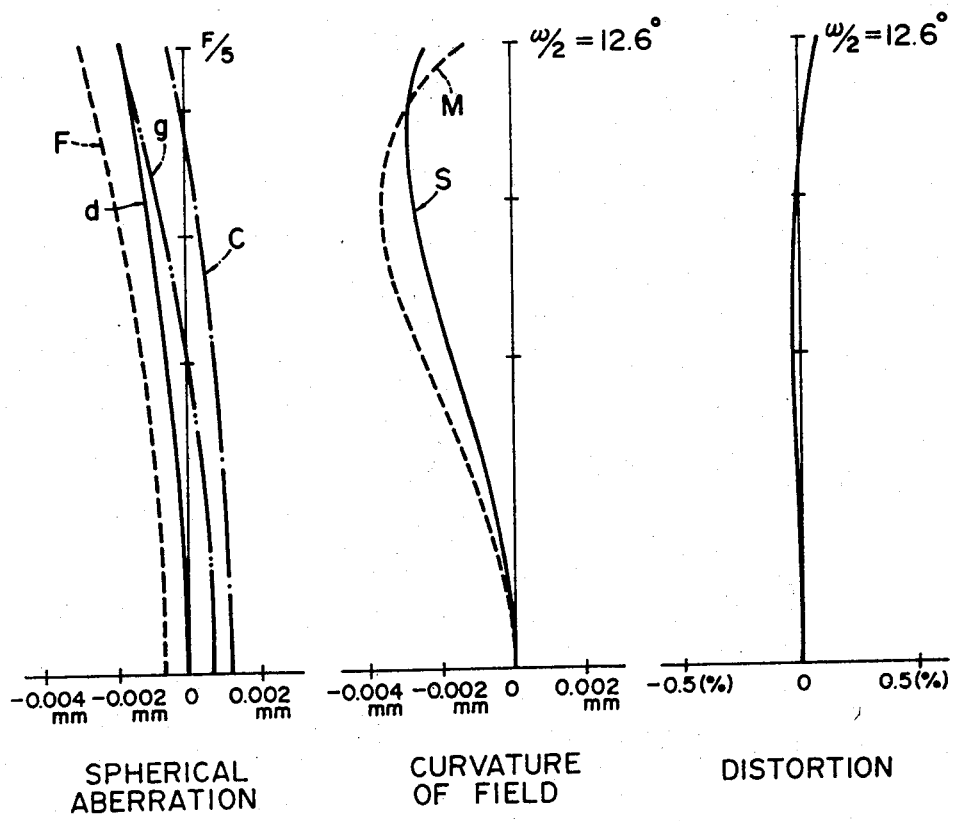
Figure 9A:
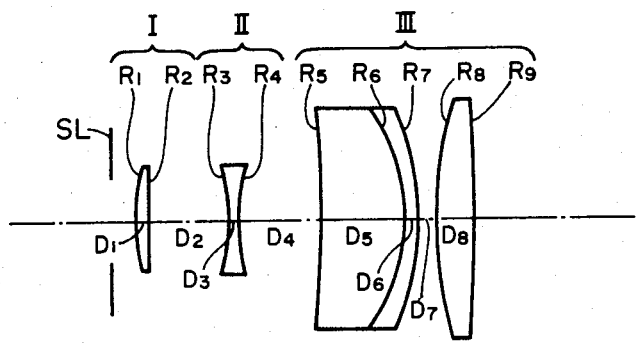
FIG. 9A is a cross-sectional view of Example 9 and FIG. 9B shows aberrations thereof.
Figure 9B:
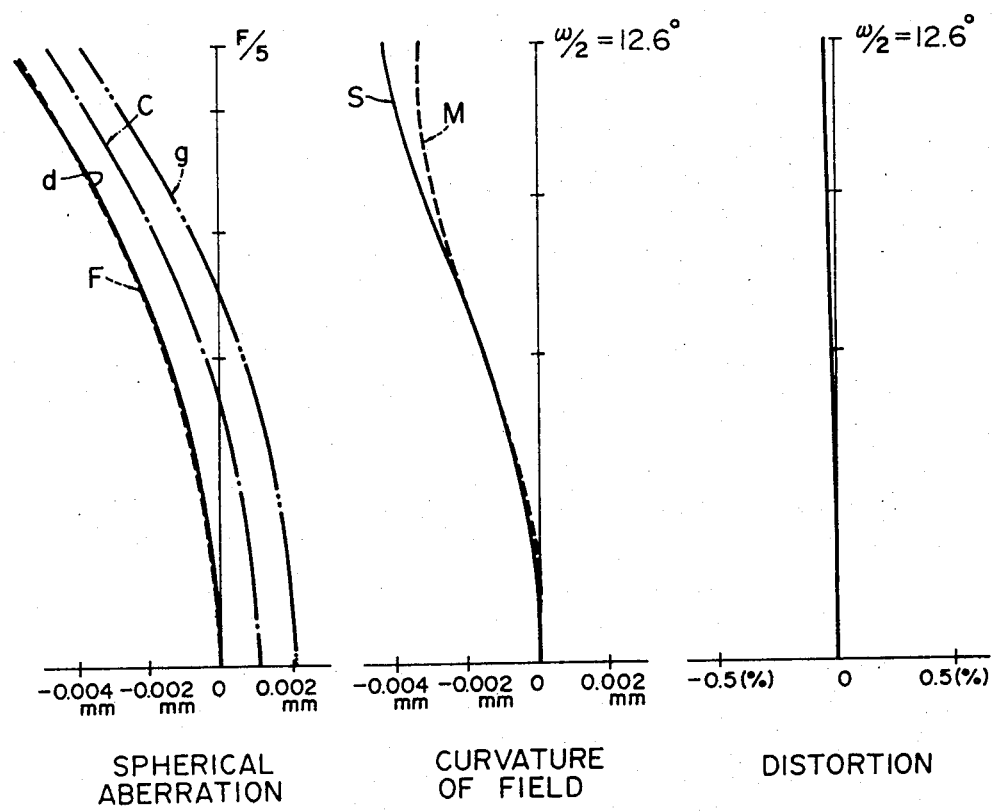
Figure 10A:
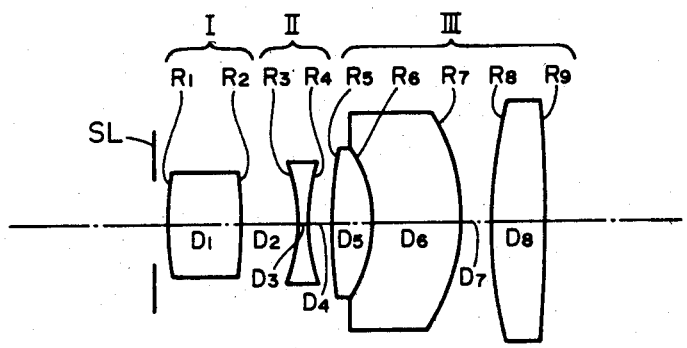
FIG. 10A is a cross-sectional view of Example 10 and FIG. 10B shows aberrations thereof.
Figure 10B:
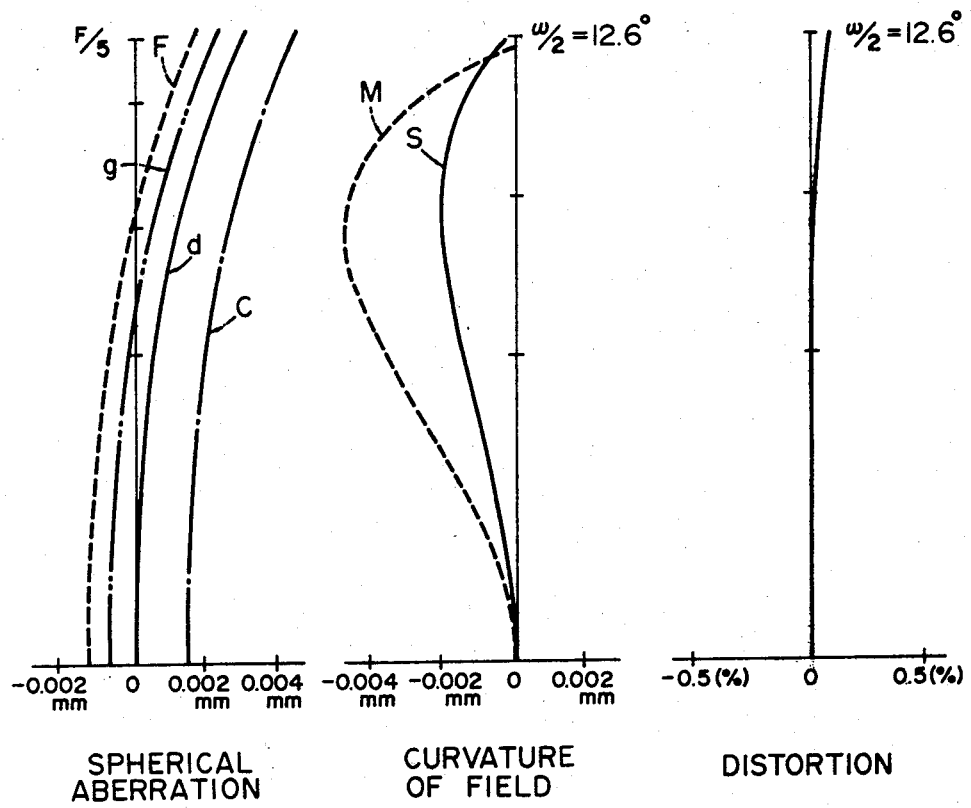
Figure 11A:
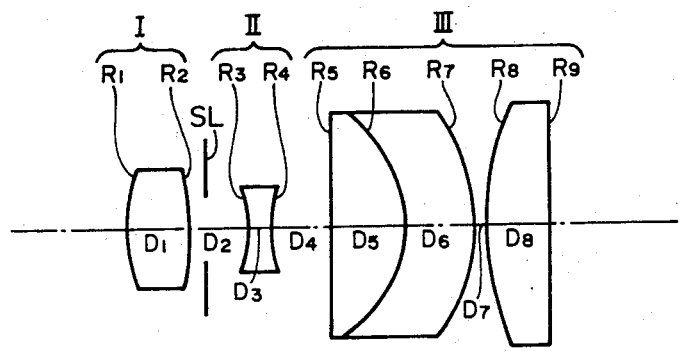
FIG. 11A is a cross-sectional view of Example 11 and FIG. 11B shows aberrations thereof.
Figure 11B:
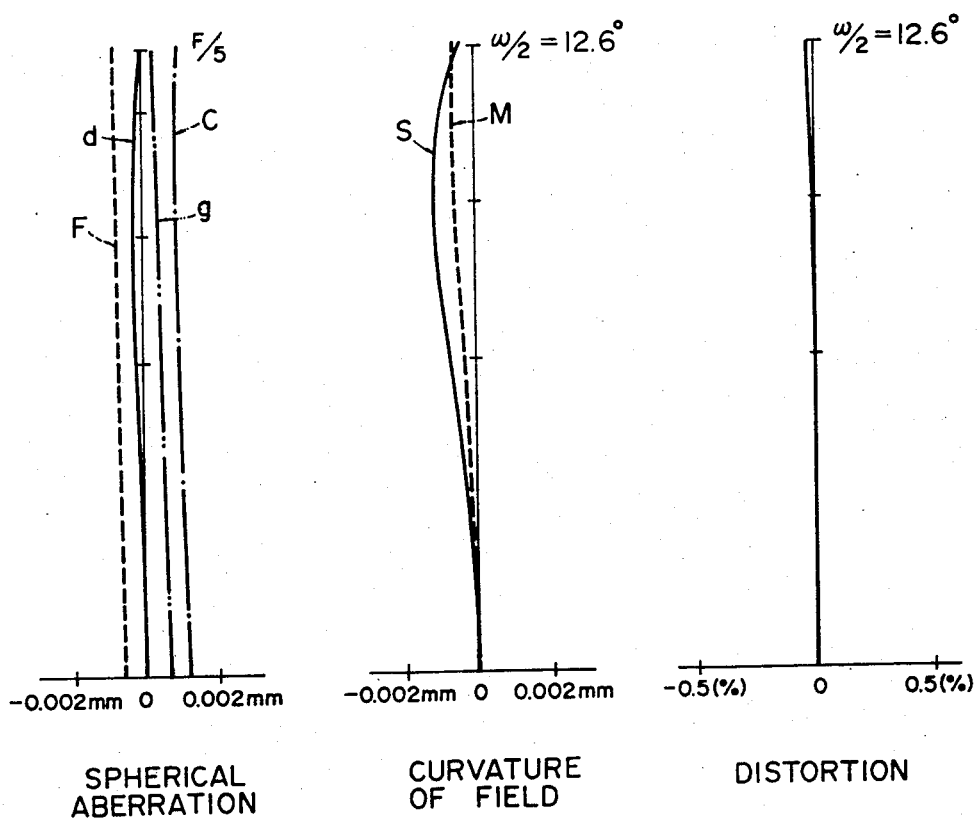
Figure 12A:
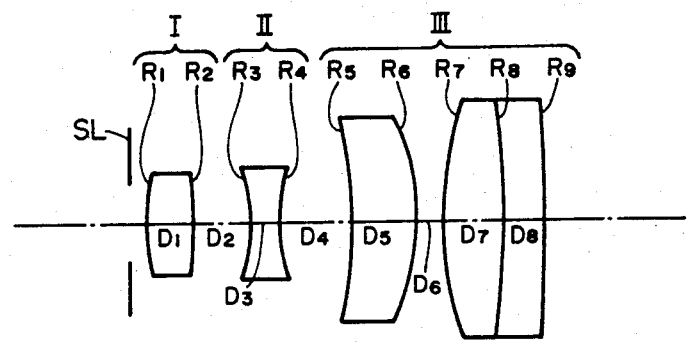
FIG. 12A is a cross-sectional view of Example 12 and FIG. 12B shows aberrations thereof.
Figure 12B:
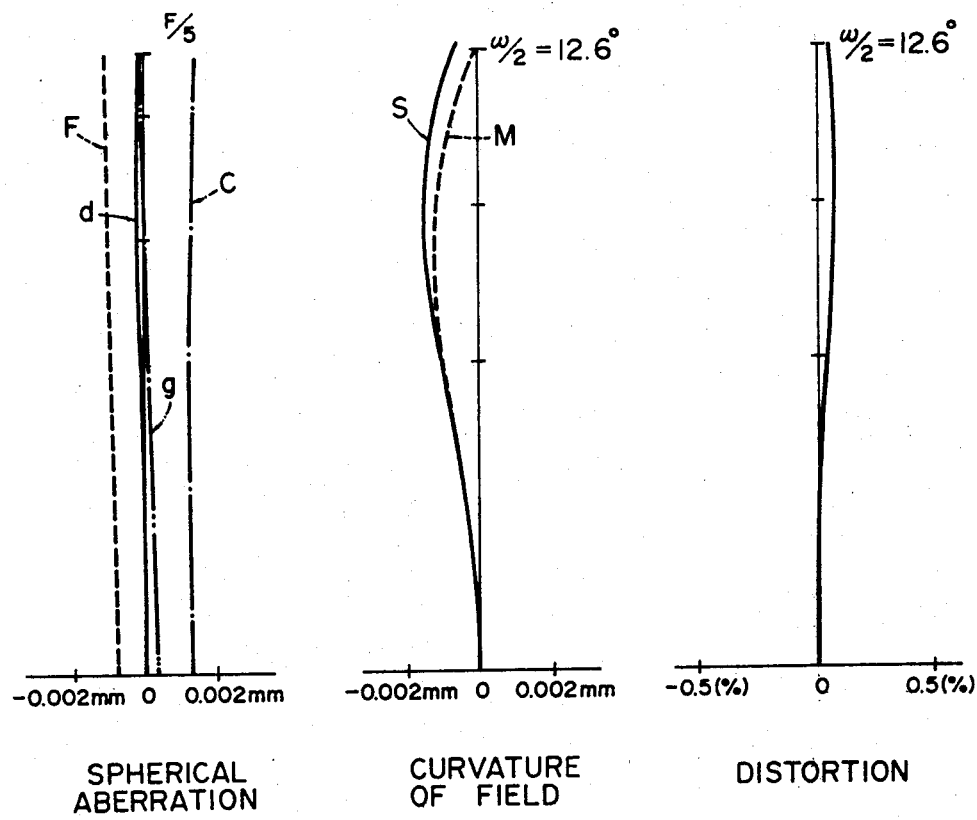

The following examples, Examples 1 to 12 together with FIGS. 1 to 12 illustrate the design of above projection lenses according to the first aspect of the invention and demonstrate the effect of the invention.

In the examples,
Ri is the radius of curvature of the i-th surface of the lens system;
Di is the thickness of air spacing on axis between the i-th surface and the i+1-th surface;
$\omega$ is angle of field;
$\beta$ is magnification of focus;
Ni is the refractive index of the i-th lens to D ray;
$\nu$i is Abbe's number of the i-th lens;
fi is the focal length of the i-th group; and D0 is the air spacing on axis from the pupil SL to the R1 surface.

For all of Examples 1 to 12 the F number is 1:5.

EXAMPLE 1

| f = 1 angle of field = 25.2° β = 0.12343 | | | |
|---|---|---|---|
| R1 = 0.3986 | D1 = 0.134 | N1 = 1.72 | ν1 = 50.2 |
| R2 = −5.6178 | D2 = 0.1653 | | |
| R3 = −0.3958 | D3 = 0.0701 | N2 = 1.80518 | ν2 = 25.4 |
| R4 = 0.4543 | D4 = 0.1345 | | |
| R5 = −2.8306 | D5 = 0.1384 | N3 = 1.697 | ν3 = 48.5 |
| R6 = −0.3292 | D6 = 0.1588 | N4 = 1.72825 | ν4 = 28.5 |
| R7 = −0.6113 | D7 = 0.0181 | | |
| R8 = 0.8726 | D8 = 0.1635 | N5 = 1.7725 | ν5 = 49.6 |
| R9 = −3.6073 | | | |
| $\|f_1/f_2\|$ = 2.0161 | $f_2/f$ = −0.2543 | $f_3/f$ = 0.4971 | D0 = 0.0213 |

EXAMPLE 2

| f = 1 angle of field = 25.2° β = −0.12343 | | | |
|---|---|---|---|
| R1 = 0.4403 | D1 = 0.1682 | N1 = 1.72 | ν1 = 50.2 |
| R2 = −1.8559 | D2 = 0.13 | | |
| R3 = −0.4636 | D3 = 0.0329 | N2 = 1.80518 | ν2 = 25.4 |
| R4 = 0.5059 | D4 = 0.1492 | | |
| R5 = −1.6321 | D5 = 0.2362 | N3 = 1.697 | ν3 = 48.5 |
| R6 = −0.4315 | D6 = 0.0414 | N4 = 1.72825 | ν4 = 28.5 |
| R7 = −0.5964 | D7 = 0.0528 | | |
| R8 = 1.0092 | D8 = 0.0925 | N5 = 1.7725 | ν5 = 49.6 |
| R9 = −5.1222 | | | |
| $\|f_1/f_2\|$ = 1.723 | $f_2/f$ = −0.296 | $f_3/f$ = 0.5764 | D0 = 0.1764 |

EXAMPLE 3

| f = 1 angle of field = 25.2° β = −0.12343 | | | |
|---|---|---|---|
| R1 = 0.3446 | D1 = 0.1461 | N1 = 1.72 | ν1 = 50.2 |
| R2 = 4.6621 | D2 = 0.1688 | | |
| R3 = −0.3246 | D3 = 0.0205 | N2 = 1.80518 | ν2 = 25.4 |
| R4 = 0.3854 | D4 = 0.0696 | | |
| R5 = 1.3077 | D5 = 0.2144 | N3 = 1.674 | ν3 = 48.5 |
| R6 = −0.3306 | D6 = 0.2108 | N4 = 1.72825 | ν4 = 28.5 |
| R7 = 0.5451 | D7 = 0.0697 | | |
| R8 = 0.9435 | D8 = 0.1443 | N5 = 1.7725 | ν5 = 49.6 |
| R9 = 28.7464 | | | |
| $\|f_1/f_2\|$ = 2.3587 | $f_2/f$ = −0.216 | $f_3/f$ = 0.4485 | D0 = 0.0219 |

EXAMPLE 4

| f = 1 angle of field = 25.2° β = −0.12343 | | | |
|---|---|---|---|
| R1 = 0.4822 | D1 = 0.1456 | N1 = 1.72 | ν1 = 50.2 |
| R2 = −35.0608 | D2 = 0.2244 | | |
| R3 = −0.4207 | D3 = 0.0325 | N2 = 1.80518 | ν2 = 25.4 |
| R4 = 0.6509 | D4 = 0.0834 | | |
| R5 = −1.3008 | D5 = 0.1128 | N3 = 1.697 | ν3 = 48.5 |
| R6 = −0.2572 | D6 = 0.1755 | N4 = 1.72825 | ν4 = 28.5 |
| R7 = −0.4887 | D7 = 0.0625 | | |
| R8 = 0.8924 | D8 = 0.1618 | N5 = 1.7725 | ν5 = 49.6 |
| R9 = −5.1437 | | | |
| $\|f_1/f_2\|$ = 2.1135 | $f_2/f$ = −0.3131 | $f_3/f$ = 0.4966 | D0 = 0 0.0399 |

EXAMPLE 5

| f = 1 angle of field = 25.2° β = −0.12343 | | | |
|---|---|---|---|
| R1 = 0.3052 | D1 = 0.1736 | N1 = 1.72 | ν1 = 50.2 |
| R2 = −1.5021 | D2 = 0.089 | | |
| R3 = −0.3001 | D3 = 0.0837 | N2 = 1.80518 | ν2 = 25.4 |
| R4 = 0.3522 | D4 = 0.1376 | | |
| R5 = 3.8193 | D5 = 0.1725 | N3 = 1.697 | ν3 = 48.5 |
| R6 = −0.5969 | D6 = 0.167 | N4 = 1.72825 | ν4 = 28.5 |
| R7 = −0.7671 | D7 = 0.0713 | | |
| R8 = 0.6312 | D8 = 0.0988 | N5 = 1.7725 | ν5 = 49.6 |
| R9 = 4.6414 | | | |
| $\|f_1/f_2\|$ = 1.9285 | $f_2/f$ = −0.1904 | $f_3/f$ = 0.4961 | D0 = 0.04 |

EXAMPLE 6

| f = 1 angle of field = 25.2° β = −0.12343 | | | |
|---|---|---|---|
| R1 = 0.4186 | D1 = 0.0891 | N1 = 1.72 | ν1 = 50.2 |
| R2 = −9.096 | D2 = 0.197 | | |
| R3 = −0.4351 | D3 = 0.0279 | N2 = 1.80518 | ν2 = 25.4 |
| R4 = 0.4955 | D4 = 0.1493 | | |
| R5 = −1.6863 | D5 = 0.1956 | N3 = 1.697 | ν3 = 48.5 |
| R6 = −0.3195 | D6 = 0.1151 | N4 = 1.72825 | ν4 = 28.5 |
| R7 = −0.5561 | D7 = 0.0153 | | |
| R8 = 0.9878 | D8 = 0.0852 | N5 = 1.7725 | ν5 = 49.6 |
| R9 = −4.6263 | | | |
| $\|f_1/f_2\|$ = 1.9652 | $f_2/f$ = −0.2844 | $f_3/f$ = 0.5261 | D0 = 0.0437 |

EXAMPLE 7

| f = 1 angle of field = 25.2° β = −0.12343 | | | |
|---|---|---|---|
| R1 = 0.4165 | D1 = 0.1912 | N1 = 1.72 | ν1 = 50.2 |
| R2 = −3.39 | D2 = 0.1481 | | |
| R3 = −0.3872 | D3 = 0.0785 | N2 = 1.80518 | ν2 = 25.4 |
| R4 = 0.4866 | D4 = 0.1315 | | |
| R5 = −0.7668 | D5 = 0.0804 | N3 = 1.697 | ν3 = 48.5 |
| R6 = −0.251 | D6 = 0.1176 | N4 = 1.72825 | ν4 = 28.5 |
| R7 = −0.4241 | D7 = 0.0631 | | |
| R8 = 0.7723 | D8 = 0.1651 | N5 = 1.7725 | ν5 = 49.6 |
| R9 = −6.2772 | | | |
| $\|f_1/f_2\|$ = 2.0437 | $f_2/f$ = −0.2571 | $f_3/f$ = 0.4901 | D0 = 0.0373 |

EXAMPLE 8

| f = 1 angle of field = 25.2° β = −0.12343 | | | |
|---|---|---|---|
| R1 = 0.3482 | D1 = 0.1182 | N1 = 1.72 | ν1 = 50.2 |
| R2 = −4.0406 | D2 = 0.1449 | | |
| R3 = −0.3748 | D3 = 0.0764 | N2 = 1.80518 | ν2 = 25.4 |
| R4 = 0.3816 | D4 = 0.1265 | | |
| R5 = 1.7347 | D5 = 0.2061 | N3 = 1.697 | ν3 = 48.5 |
| R6 = −0.4603 | D6 = 0.1757 | N4 = 1.72825 | ν4 = 28.5 |
| R7 = −0.7049 | D7 = 0.0618 | | |
| R8 = 0.8119 | D8 = 0.1439 | N5 = 1.7725 | ν5 = 49.6 |
| R9 = 8.081 | | | |
| $\|f_1/f_2\|$ = 2.0039 | $f_2/f$ = −0.2247 | $f_3/f$ = 0.4957 | D0 = 0.0344 |

EXAMPLE 9

| f = 1 angle of field = 25.2° β = −0.12343 | | | |
|---|---|---|---|
| R1 = 0.4429 | D1 = 0.0335 | N1 = 1.72 | ν1 = 50.2 |
| R2 = −4.1849 | D2 = 0.204 | | |
| R3 = −0.5629 | D3 = .0209 | N2 = 1.80518 | ν2 = 25.4 |
| R4 = 0.4844 | D4 = 0.2198 | | |
| R5 = −2.4032 | D5 = 0.2335 | N3 = 1.697 | ν3 = 48.5 |
| R6 = −0.4017 | D6 = 0.0267 | N4 = 1.72825 | ν4 = 28.5 |
| R7 = −0.6186 | D7 = 0.0515 | | |
| R8 = 1.0314 | D8 = 0.0917 | N5 = 1.7725 | ν5 = 49.6 |
| R9 = −6.7698 | | | |
| $\|f_1/f_2\|$ = 1.741 | $f_2/f$ = −0.3205 | $f_3/f$ = 0.5832 | D0 = 0.0585 |

EXAMPLE 10

| f = 1 angle of field = 25.2° β = −0.12343 | | | |
|---|---|---|---|
| R1 = 0.3693 | D1 = 0.1981 | N1 = 1.72 | ν1 = 50.2 |
| R2 = 2.5301 | D2 = 0.1765 | | |
| R3 = −0.2971 | D3 = 0.0161 | N2 = 1.80518 | ν2 = 25.4 |
| R4 = 0.4745 | D4 = 0.0643 | | |
| R5 = 1.9365 | D5 = 0.1127 | N3 = 1.697 | ν3 = 48.5 |
| R6 = −0.2642 | D6 = 0.2305 | N4 = 1.72825 | ν4 = 28.5 |
| R7 = −0.4824 | D7 = 0.07 | | |
| R8 = 0.9622 | D8 = 0.1526 | N5 = 1.7725 | ν5 = 49.6 |
| R9 = −9.8269 | | | |
| $|f_1/f_2|$ = 2.5728 | $f_2/f$ = −0.2248 | $f_3/f$ = 0.4199 | DO = 0.0248 |

EXAMPLE 11

| f = 1 angle of field = 25.2° β = −0.12343 | | | |
|---|---|---|---|
| R1 = 0.3879 | D1 = 0.1531 | N1 = 1.72 | ν1 = 50.2 |
| R2 = −9.0167 | D2 = 0.165 | | |
| R3 = −0.3786 | D3 = 0.0698 | N2 = 1.80518 | ν2 = 25.4 |
| R4 = 0.4629 | D4 = 0.1477 | | |
| R5 = 21.2811 | D5 = 0.1962 | N3 = 1.697 | ν3 = 48.5 |
| R6 = −0.3036 | D6 = 0.1701 | N4 = 1.72825 | ν4 = 28.5 |
| R7 = −0.5721 | D7 = 0.052 | | |
| R8 = 0.7612 | D8 = 0.1554 | N5 = 1.7725 | ν5 = 49.6 |
| R9 = 6.2487 | | | |
| $|f_1/f_2|$ = 2.0849 | $f_2/f$ = −0.2494 | $f_3/f$ = 0.4834 | DO = −0.2064 |

EXAMPLE 12

| f = 1 angle of field = 25.2° β = −0.12343 | | | |
|---|---|---|---|
| R1 = 0.3756 | D1 = 0.1325 | | |
| R2 = −3.3599 | D2 = 0.145 | | |
| R3 = −0.3905 | D3 = 0.0774 | | |
| R4 = 0.4348 | D4 = 0.1877 | | |
| R5 = −2.0321 | D5 = 0.1835 | | |
| R6 = −0.578 | D6 = 0.0618 | | |
| R7 = 0.8196 | D7 = 0.1767 | | |
| R8 = −1.6015 | D8 = 0.1025 | | |
| R9 = −3.9946 | | | |
| $|f_1/f_2|$ = 1.9421 | $f_2/f$ = −0.2452 | $f_3/f$ = 0.5112 | DO = 0.0327 |

Ternary aberration coefficients of the above examples are shown in the following table, Table 1. In the table, I is spherical aberration, II is coma, III is astigmatism, P is Petzval sum and V is distortion.

TABLE 1

| coefficient | Example | | | |
|---|---|---|---|---|
| | Example 1 | Example 2 | Example 3 | Example 4 |
| I | 0.12406 | 0.46004 | −0.14528 | 0.02664 |
| II | 0.1735 | 0.1418 | 0.40244 | 0.26765 |
| III | 0.01027 | 0.03254 | 0.17935 | 0.05713 |
| P | 0.17223 | 0.27954 | 0.09523 | 0.21265 |
| V | −0.05443 | 0.13357 | −0.01235 | −0.02325 |
| | Example 5 | Example 6 | Example 7 | Example 8 |
| I | 0.31882 | 0.16961 | 0.22606 | 0.32845 |
| II | 0.16566 | 0.24766 | 0.36047 | 0.19517 |
| III | 0.13201 | 0.05117 | 0.12012 | 0.09247 |
| P | 0.13286 | 0.13695 | 0.1091 | 0.24124 |
| V | 0.10842 | −0.0848 | −0.32938 | 0.04887 |
| | Example 9 | Example 10 | Example 11 | Example 12 |
| I | 0.87371 | −0.31711 | 0.08399 | 0.08932 |
| II | 0.18237 | 0.45304 | 0.37468 | 0.19056 |
| III | 0.00096 | 0.22948 | −0.04541 | −0.00143 |
| P | 0.30255 | 0.06921 | 0.2076 | 0.21645 |
| V | 0.05155 | 0.05192 | 0.01822 | −0.08943 |

Hereinafter, description is made of the conditions (1') to (3') previously given for the lens according to the second embodiment of the invention.

Condition (1') is necessary for good correction of spherical aberration while maintaining the balance of refractive powers of the first and second lens groups. The lens of the present invention is of telecentric system and the spacing between the principal points of the second and third groups is broader than that between those of the first and second groups. Therefore, positions at which paraxial rays pass through the first group are greatly spaced apart from the optical axis and thereby a large quantity of spherical aberration is produced. If $|f_1/f_2|$ is below the lower limit of 1.72, then the refractive power of the first group becomes high and therefore the paraxial rays passing through the surface will be intensely refracted in the direction toward the optical axis so that a large quantity of negative spherical aberration may be produced. On the contrary, when $|f_1/f_2|$ is over the upper limit, 2.58, the refractive power of the second lens group becomes high and the second group will produces such a level of positive spherical aberration which may overly compensate the negative spherical aberration produced by the first lens group.

Condition (2') is for correction of curvature of field. When $f_1/f_2$ exceeds the upper limit, −0.19, the Petzval sum is overcorrected and the correction of the curvature of field becomes excessive. To overcome the drawback, the absolute value of refractive power of the third group must be increased. However, as described later in connection with condition (3'), by increasing the absolute value of refractive power there is produced in the third lens a large quantity of distortion the correction of which is very difficult. On the contrary, if $f_2/f$ is smaller than the lower limit, then the correction of Petzval sum of the whole system becomes difficult and curvature of field is undercorrected.

Condition (3') should be satisfied to correct the curvature of field and distortion. This is because the lens of the present invention is of telecentric system and the principal rays pass through the third lens group at positions far away from the optical axis. If $f_3/f$ is below the lower limit of 0.41, then the refractive power of the third group becomes high and the principal rays passing through the third group are intensely refracted in the direction toward the optical axis. As a result, a large quantity of distortion is produced. On the contrary, when $f_3/f$ is over the upper limit of 0.59, curvature of field becomes worse to the extent that it is no longer possible to correct the aberration.

Now, the shape of the above projection lens according to the second embodiment of the invention is described in detail.

As previously described, the projection lens of the present invention is required to be precise in terms of F number. To meet the requirement, it is advantageous that spherical abberation be corrected at the first group in which paraxial rays are most apart from the optical axis of the lens. To this end, the lens surface on the side of object field of the first group is convexed toward the object field side.

In this type of lens, Petzval sum is corrected primarily by the power of the second group. Therefore, the condition of power for the second group often becomes very severe and the second group is apt to produce various aberrations. To reduce the aberrations as much as possible, the second lens group is shaped as a double concave lens.

Since the lens of the present invention is a telecentric lens, off-axial principal rays should be spaced at a large distance from the optical axis by the third lens group. It is preferred that the nearest lens to the object field of the third group be shaped as a positive meniscus lens whose concaved surface is facing the side of object field. Further, it is preferred that the lens located nearest to the image field of the third group be shaped as a meniscus lens whose concaved surface is facing the image field side. By doing so, the principal rays are made spaced apart from the optical axis by the first mentioned meniscus lens and aberrations are corrected by the concave surface of the second mentioned meniscus lens. In addition, since the lens has no negative power, the requirement of lengthening the back focal length of the whole lens system can be attained at the same time.

Figure 13A:
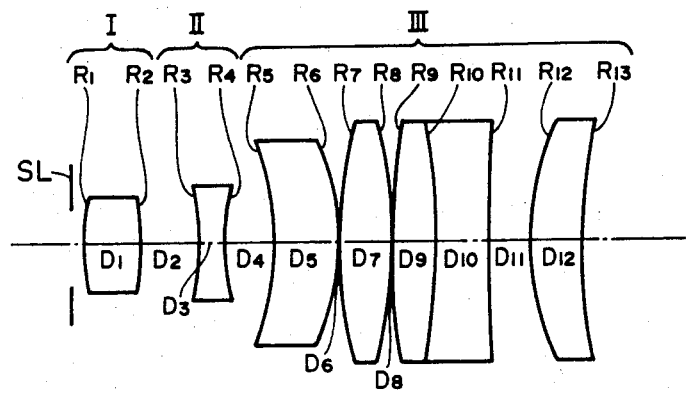
FIG. 13A is a cross-sectional view of Example 13 and FIG. 13B shows aberrations thereof and FIG. 13C shows transverse aberrations on Gaussian image plane thereof.
Figure 13B:
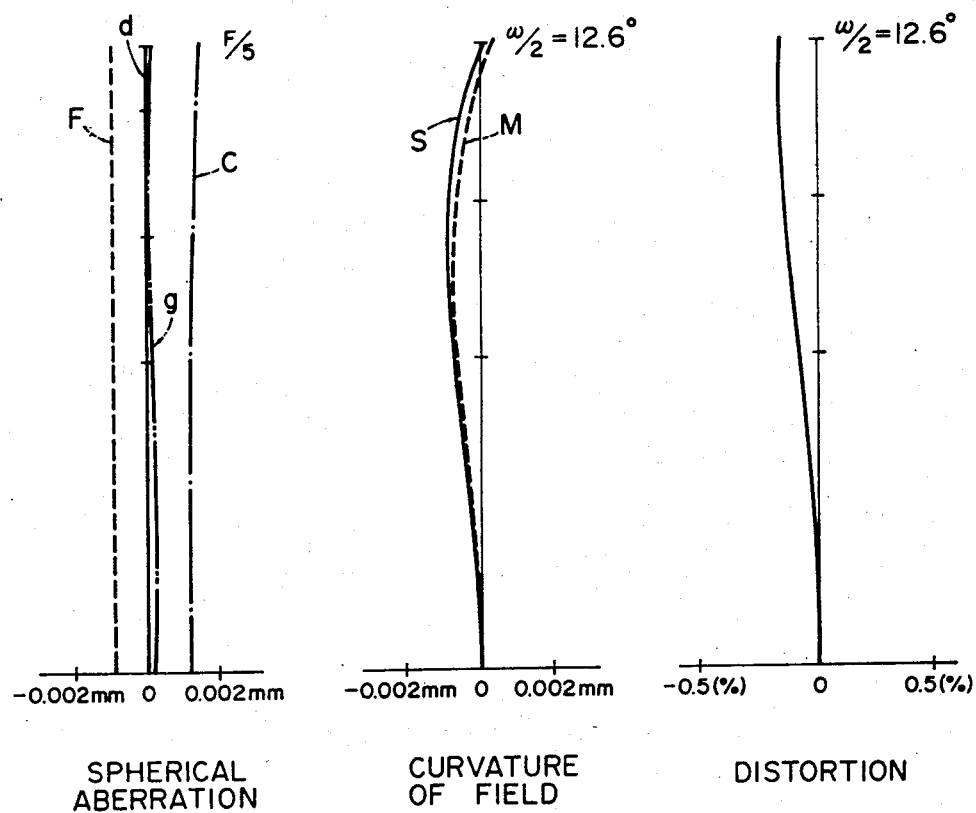
Figure 13C:
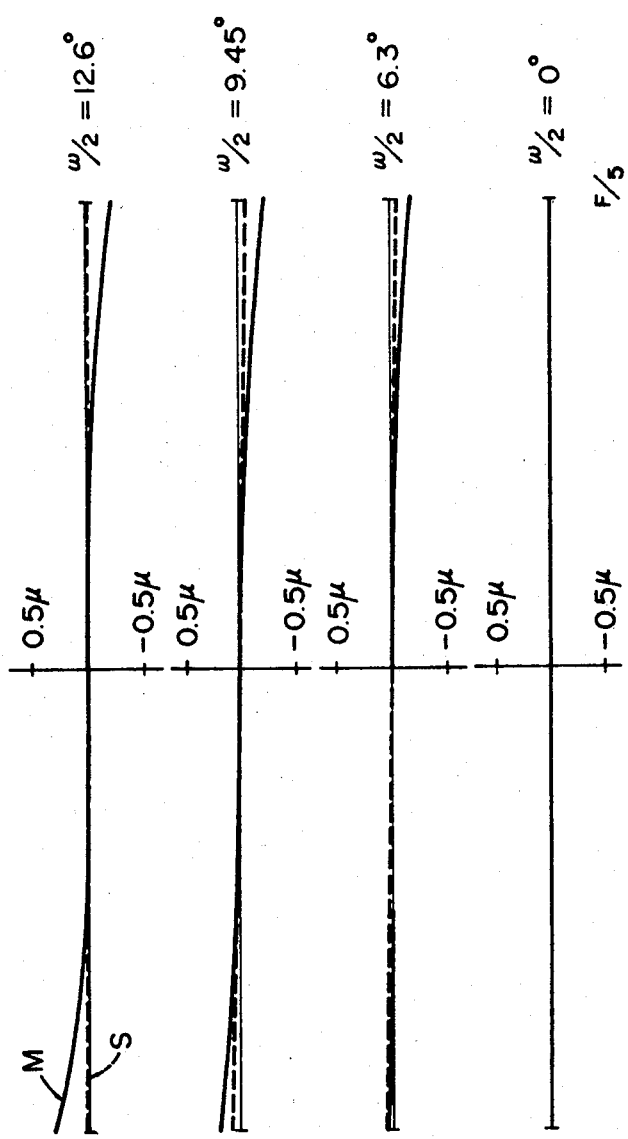
Figure 14A:
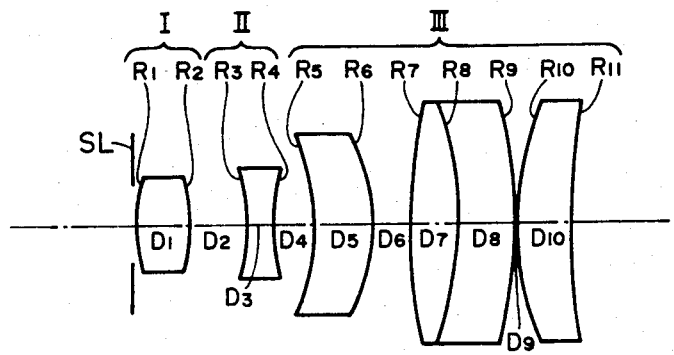
FIG. 14A is a cross-sectional view of Example 14 and FIG. 14B shows aberrations thereof.
Figure 14B:
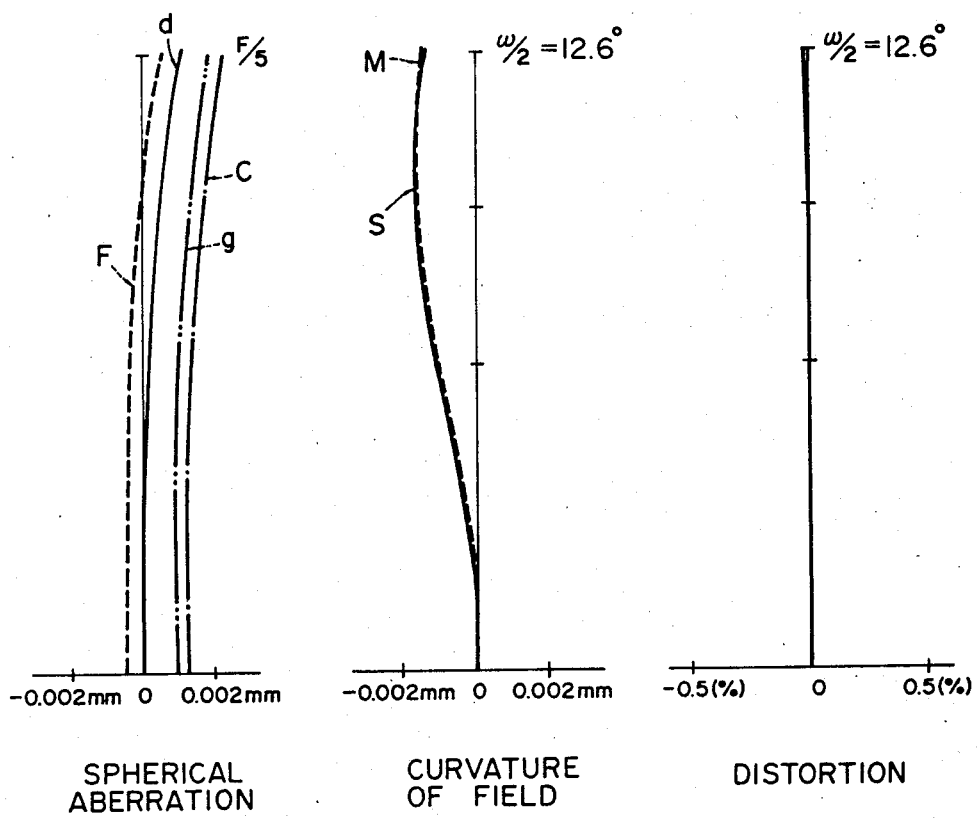
Figure 15A:
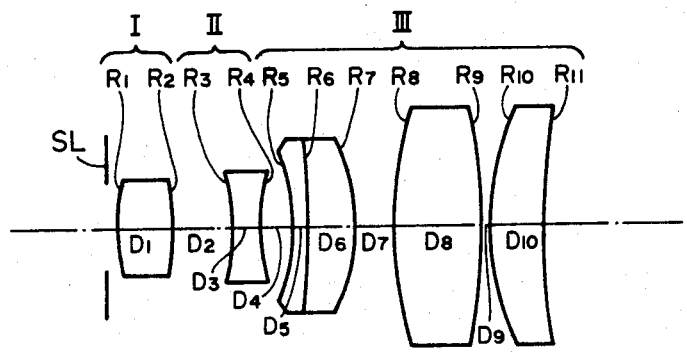
FIG. 15A is a cross-sectional view of Example 15 and FIG. 15B shows aberrations thereof.
Figure 15B:
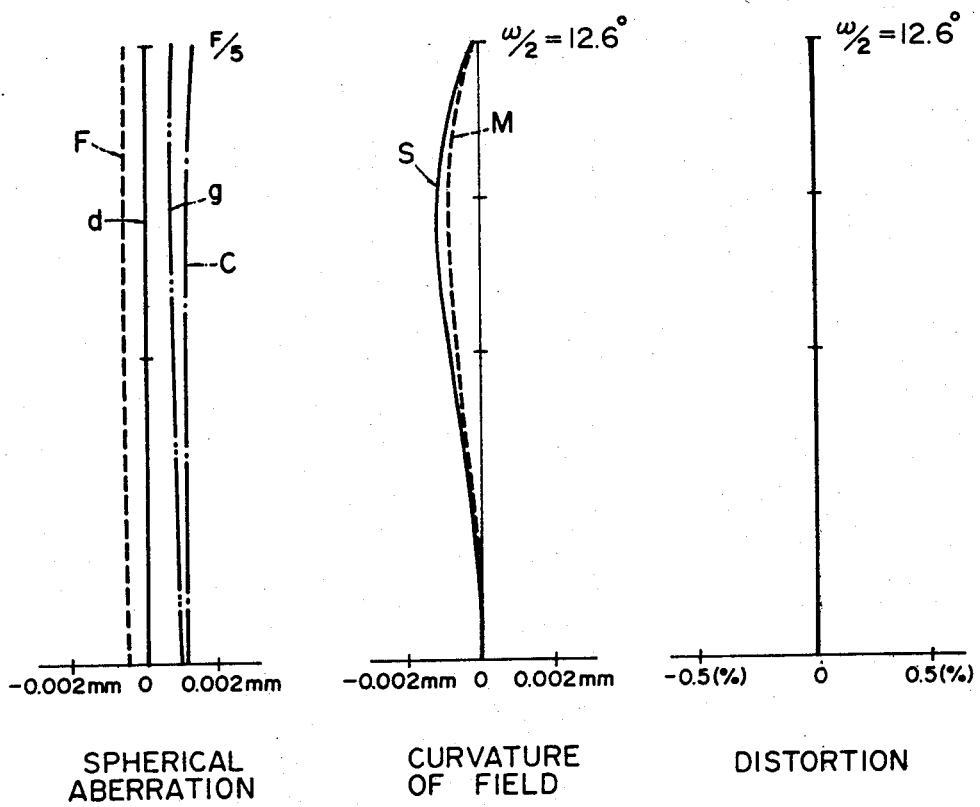
Figure 16A:
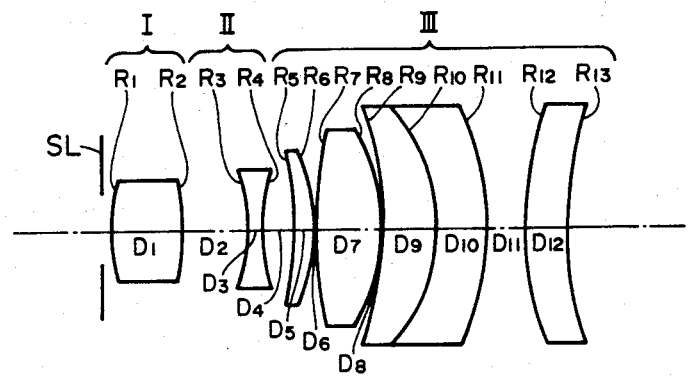
FIG. 16A is a cross-sectional view of Example 16 and FIG. 16B shows aberrations thereof.
Figure 16B:
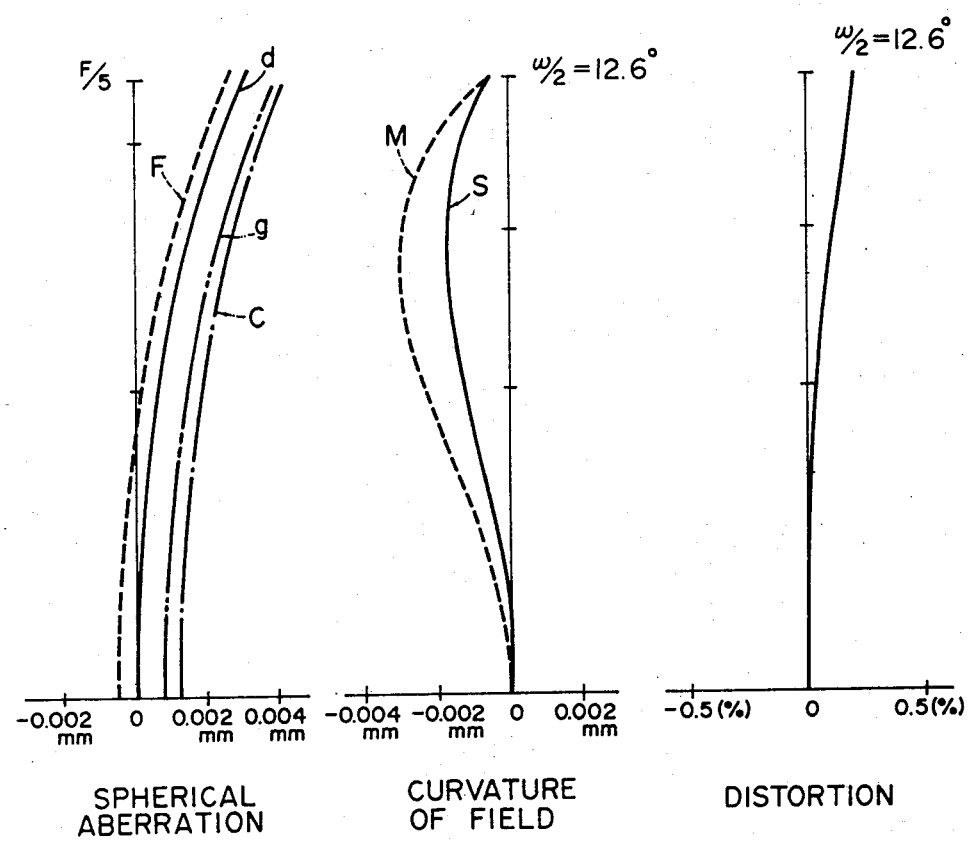
Figure 17A:
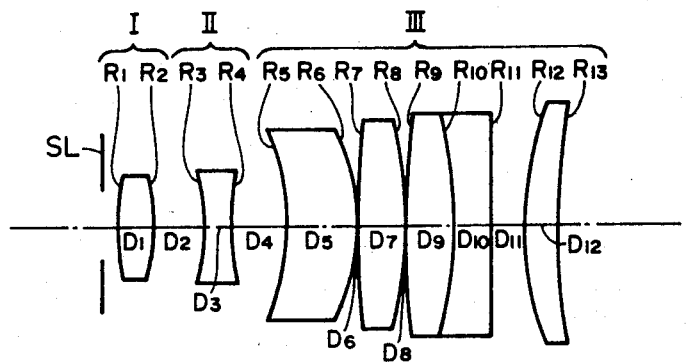
FIG. 17A is a cross-sectional view of Example 17 and FIG. 17B shows aberrations thereof.
Figure 17B:
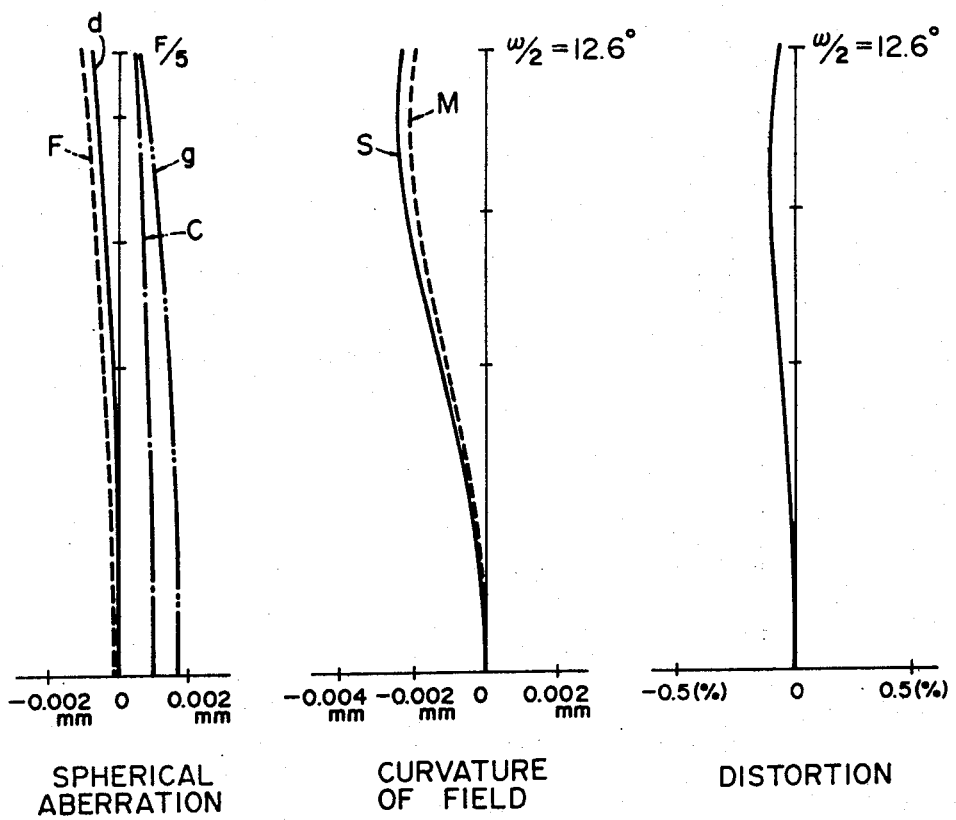
Figure 18A:
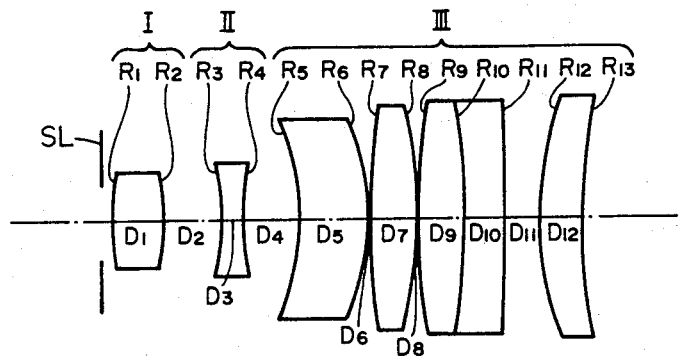
FIG. 18A is a cross-sectional view of Example 18 and FIG. 18B shows aberrations thereof.
Figure 18B:
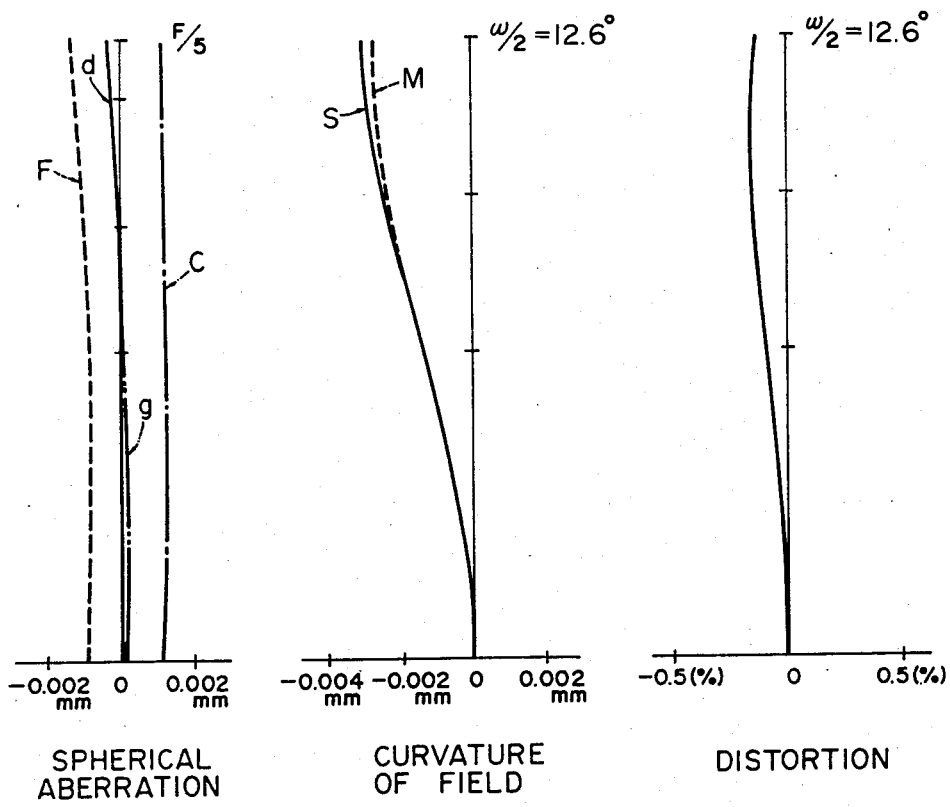
Figure 19A:
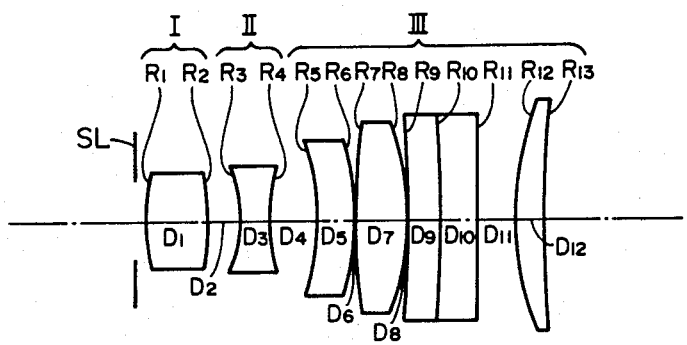
FIG. 19A is a cross-sectional view of Example 19 and FIG. 19B shows aberrations thereof.
Figure 19B:
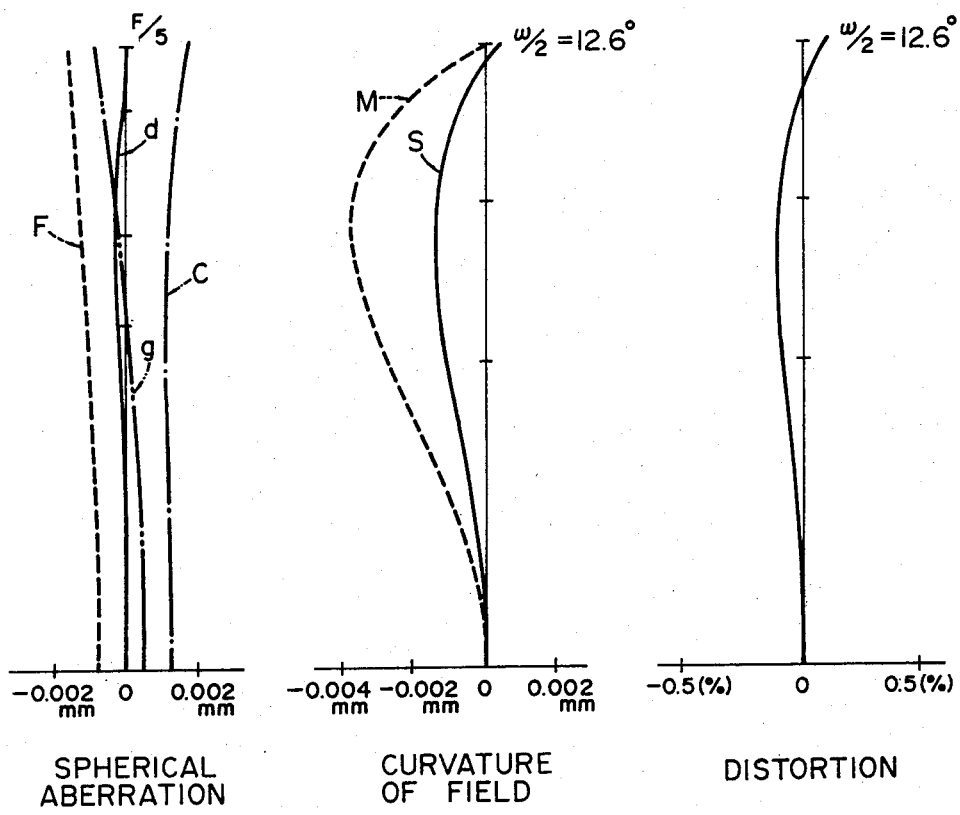
Figure 20A:
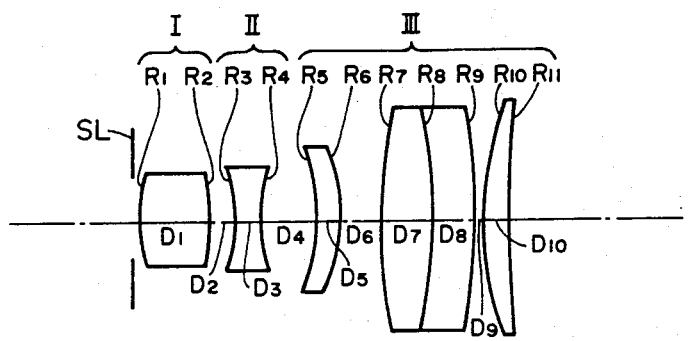
FIG. 20A is a cross-sectional view of Example 20 and FIG. 20B shows aberrations thereof.
Figure 20B:
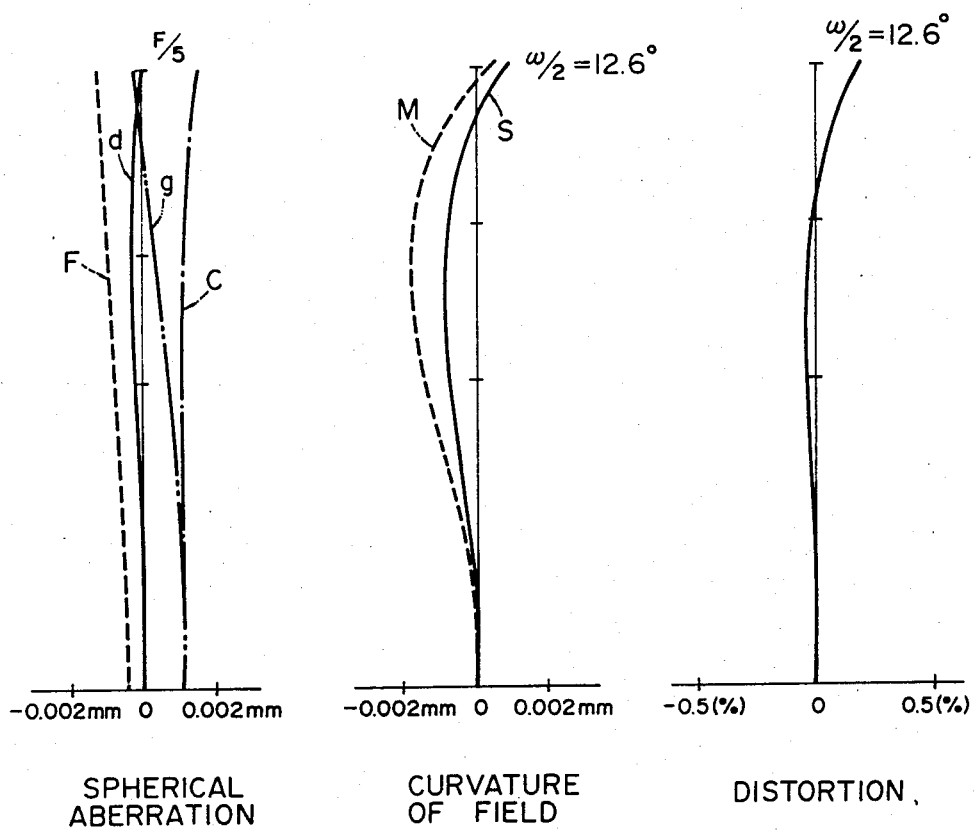
Figure 21A:
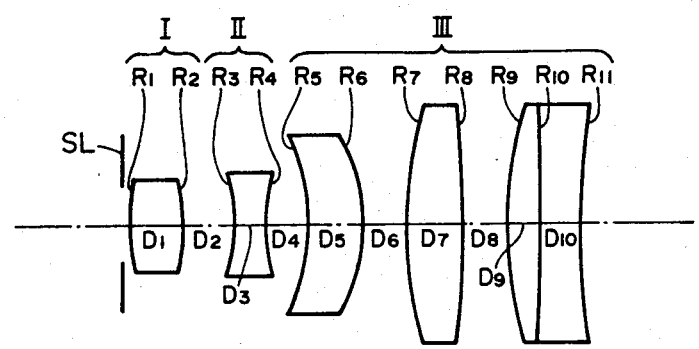
FIG. 21A is a cross-sectional view of Example 21 and FIG. 21B shows aberrations thereof.
Figure 21B:
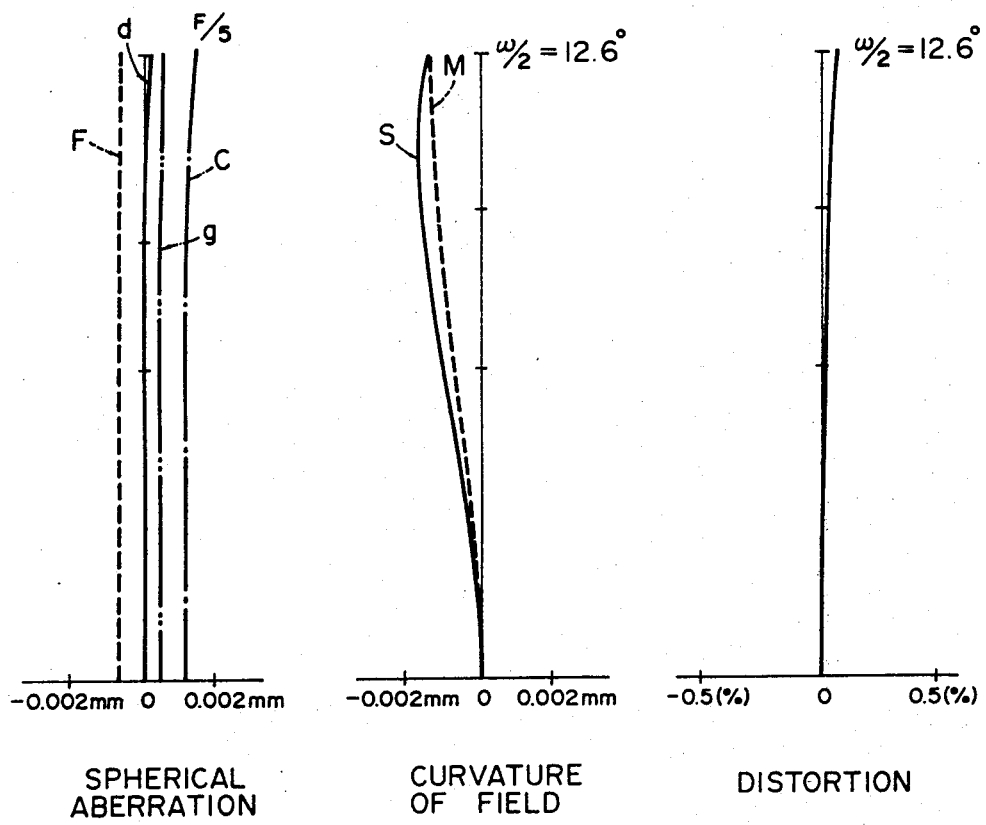

The following examples, Example 13 to 21 together with FIGS. 13 to 21 illustrate the design of the projection lenses of the above second embodiment of the present invention. In all the following examples, focal length f is standarized to 1, F number to 5.0, angle of field $\omega$ to 25.2° and focus magnification $\beta$ to $-0.12343$.

Again, Ri is the radius of curvature of the i-th surface;
Di is the thichness on axis or air spacing on axis between the i-th surface and the i+1-th surface;
Ni is the refractive index of the i-th lens to D ray;
$\nu$i is Abbe's number of the i-th lens;
fi is the focal length of the i-th lens group; and
D0 is the air spacing on axis from pupil SL to the R1 surface.

EXAMPLE 13

| \multicolumn{4}{c}{f = 1 1:5 angle of field = 25.2° $\beta$ = $-0.12343$} | | | |
|---|---|---|---|
| R1 = 0.4235 | D1 = 0.1596 | N1 = 1.72 | $\nu$1 = 50.2 |
| R2 = $-2.934$ | D2 = 0.156 | | |
| R3 = $-0.4137$ | D3 = 0.0658 | N2 = 1.80518 | $\nu$2 = 25.4 |
| R4 = 0.5172 | D4 = 0.1378 | | |
| R5 = $-0.5814$ | D5 = 0.1784 | N3 = 1.60311 | $\nu$3 = 60.7 |
| R6 = $-0.5646$ | D6 = 0.0037 | | |
| R7 = 1.7452 | D7 = 0.1295 | N4 = 1.757 | $\nu$4 = 47.9 |
| R8 = $-1.0784$ | D8 = 0.0037 | | |
| R9 = 2.934 | D9 = 0.1099 | N5 = 1.697 | $\nu$5 = 48.5 |
| R10 = $-1.6199$ | D10 = 0.141 | N6 = 1.72825 | $\nu$6 = 28.5 |
| R11 = 7.2159 | D11 = 0.1119 | | |
| R12 = 0.6834 | D12 = 0.1345 | N7 = 1.7725 | $\nu$7 = 49.6 |
| R13 = 1.0343 | | | |
| $|f_1/f_2|$ = 1.895 | $f_2/f$ = $-0.2767$ | $f_3/f$ = 0.5216 | D0 = 0.0291 |

EXAMPLE 14

| \multicolumn{4}{c}{f = 1 1:5 angle of field = 25.2° $\Gamma$ = $-0.12343$} | | | |
|---|---|---|---|
| R1 = 0.4309 | D1 = 0.1372 | N1 = 1.72 | $\nu$1 = 50.2 |
| R2 = $-3.3104$ | D2 = 0.1659 | | |
| R3 = $-0.4118$ | D3 = 0.068 | N2 = 1.80518 | $\nu$2 = 25.4 |
| R4 = 0.5596 | D4 = 0.1133 | | |
| R5 = $-0.5297$ | D5 = 0.1596 | N3 = 1.60311 | $\nu$3 = 60.7 |
| R6 = $-0.4196$ | D6 = 0.0948 | | |
| R7 = 1.2334 | D7 = 0.1282 | N4 = 1.697 | $\nu$4 = 48.5 |
| R8 = $-0.7865$ | D8 = 0.1423 | N5 = 1.72825 | $\nu$5 = 28.5 |
| R9 = $-1.5704$ | D9 = 0.0168 | | |
| R10 = 0.8342 | D10 = 0.1341 | N6 = 1.7725 | $\nu$6 = 49.6 |
| R11 = 1.4571 | | | |
| $|f_1/f_2|$ = 1.8826 | $f_2/f$ = $-0.2857$ | $f_3/f$ = 0.5303 | D0 = 0.0069 |

EXAMPLE 15

| \multicolumn{4}{c}{f = 1 1:5 angle of field = 25.2° $\beta$ = $-0.12343$} | | | |
|---|---|---|---|
| R1 = 0.4227 | D1 = 0.1398 | N1 = 1.72 | $\nu$1 = 50.2 |
| R2 = $-3.6537$ | D2 = 0.1709 | | |
| R3 = $-0.402$ | D3 = 0.0714 | N2 = 1.80518 | $\nu$2 = 25.4 |
| R4 = 0.5558 | D4 = 0.0827 | | |
| R5 = $-0.5313$ | D5 = 0.0414 | N3 = 1.76182 | $\nu$3 = 26.6 |
| R6 = $-1.0604$ | D6 = 0.1282 | N4 = 1.60311 | $\nu$4 = 60.7 |
| R7 = $-0.414$ | D7 = 0.1031 | | |
| R8 = 1.335 | D8 = 0.2223 | N5 = 1.697 | $\nu$5 = 48.5 |
| R9 = $-1.5253$ | D9 = 0.0315 | | |
| R10 = 0.7952 | D10 = 0.1356 | N6 = 1.7725 | $\nu$6 = 49.6 |
| R11 = 1.5874 | | | |
| $|f_1/f_2|$ = 1.904 | $f_2/f$ = $-0.2804$ | $f_3/f$ = 0.5184 | D0 = 0.0195 |

EXAMPLE 16

| \multicolumn{4}{c}{f = 1 1:5 angle of field = 25.2° $\beta$ = $-0.12343$} | | | |
|---|---|---|---|
| R1 = 0.3957 | D1 = 0.1939 | N1 = 1.72 | $\nu$1 = 50.2 |
| R2 = 2.4014 | D2 = 0.1921 | | |
| R3 = $-0.3159$ | D3 = 0.0303 | N2 = 1.80518 | $\nu$2 = 25.4 |
| R4 = 0.5107 | D4 = 0.0846 | | |
| R5 = $-1.0159$ | D5 = 0.0546 | N3 = 1.60311 | $\nu$3 = 60.7 |
| R6 = $-0.4331$ | D6 = 0.0037 | | |
| R7 = 2.5196 | D7 = 0.1745 | N4 = 1.757 | $\nu$4 = 47.9 |
| R8 = $-0.5692$ | D8 = 0.0037 | | |
| R9 = $-0.6627$ | D9 = 0.1387 | N5 = 1.697 | $\nu$5 = 48.5 |
| R10 = $-0.4418$ | D10 = 0.1477 | N6 = 1.72825 | $\nu$6 = 28.5 |
| R11 = $-0.5971$ | D11 = 0.0856 | | |
| R12 = 0.71 | D12 = 0.1196 | N7 = 1.7725 | $\nu$7 = 49.6 |
| R13 = 0.7761 | | | |
| $|f_1/f_2|$ = 2.6519 | $f_2/f$ = $-0.2385$ | $f_3/f$ = 0.4206 | D0 = 0.0158 |

EXAMPLE 17

| \multicolumn{4}{c}{f = 1 1:5 angle of field = 25.2° $\Gamma$ = $-0.12343$} | | | |
|---|---|---|---|
| R1 = 0.4103 | D1 = 0.0989 | N1 = 1.72 | $\nu$1 = 50.2 |
| R2 = $-2.1886$ | D2 = 0.1497 | | |
| R3 = $-0.4378$ | D3 = 0.0595 | N2 = 1.80518 | $\nu$2 = 25.4 |
| R4 = 0.5473 | D4 = 0.1499 | | |
| R5 = $-0.5567$ | D5 = 0.1904 | N3 = 1.60311 | $\nu$3 = 60.7 |
| R6 = $-0.5263$ | D6 = 0.0036 | | |
| R7 = 5.6929 | D7 = 0.1218 | N4 = 1.757 | $\nu$4 = 47.9 |
| R8 = $-1.368$ | D8 = 0.0036 | | |
| R9 = 3.3639 | D9 = 0.1172 | N5 = 1.697 | $\nu$5 = 48.5 |
| R10 = $-1.539$ | D10 = 0.1 | N6 = 1.72825 | $\nu$6 = 28.5 |
| R11 = 35.1532 | D11 = 0.0915 | | |
| R12 = 0.6849 | D12 = 0.0815 | N7 = 1.7725 | $\nu$7 = 49.6 |
| R13 = 1.4832 | | | |
| $|f_1/f_2|$ = 1.6578 | $f_2/f$ = $-0.2941$ | $f_3$ = 0.5815 | D0 = 0.02 |

EXAMPLE 18

| \multicolumn{4}{c}{f = 1 1:5 angle of field = 25.2° $\beta$ = $-0.12343$} | | | |
|---|---|---|---|
| R1 = 0.4616 | D1 = 0.1423 | N1 = 1.72 | $\nu$1 = 50.2 |
| R2 = $-2.5065$ | D2 = 0.1625 | | |
| R3 = $-0.4707$ | D3 = 0.0522 | N2 = 1.80518 | $\nu$2 = 25.4 |
| R4 = 0.6353 | D4 = 0.1537 | | |
| R5 = $-0.5035$ | D5 = 0.1863 | N3 = 1.60311 | $\nu$3 = 60.7 |
| R6 = $-0.5187$ | D6 = 0.0037 | | |
| R7 = 3.1351 | D7 = 1.1227 | N4 = 1.757 | $\nu$4 = 47.9 |
| R8 = $-1.4508$ | D8 = 0.0037 | | |
| R9 = 2.1422 | D9 = 0.1286 | N5 = 1.697 | $\nu$5 = 48.5 |
| R10 = $-1.3417$ | D10 = 0.1032 | N6 = 1.72825 | $\nu$6 = 28.5 |
| R11 = 27.4187 | D11 = 0.0895 | | |
| R12 = 0.7259 | D12 = 0.1182 | N7 = 1.7725 | $\nu$7 = 49.6 |
| R13 = 1.2478 | | | |
| $|f_1/f_2|$ = 1.6798 | $f_2/f$ = $-0.3289$ | $f_3/f$ = 0.5736 | D0 = 0.0156 |

EXAMPLE 19

| \multicolumn{4}{c}{f = 1  1:5 angle of field = 25.2° β = −0.12343} |
|---|---|---|---|
| R1 = 0.3092 | D1 = 0.1798 | N1 = 1.72 | ν1 = 50.2 |
| R2 = −1.3737 | D2 = 0.0857 | | |
| R3 = −0.2973 | D3 = 0.085 | N2 = 1.80518 | ν2 = 25.4 |
| R4 = 0.3564 | D4 = 0.1288 | | |
| R5 = −0.5992 | D5 = 0.0897 | N3 = 1.60311 | ν3 = 60.7 |
| R6 = −0.6701 | D6 = 0.0037 | | |
| R7 = 2.6866 | D7 = 0.138 | N4 = 1.757 | ν4 = 47.9 |
| R8 = −0.6575 | D8 = 0.0037 | | |
| R9 = −2.5082 | D9 = 0.0833 | N5 = 1.697 | ν5 = 48.5 |
| R10 = −3.5115 | D10 = 0.101 | N6 = 1.72825 | ν6 = 28.5 |
| R11 = −11.326 | D11 = 0.089 | | |
| R12 = 0.5951 | D12 = 0.0767 | N7 = 1.7725 | ν7 = 49.6 |
| R13 = 2.425 | | | |
| $|f_1/f_2|$ = 1.9288 | $f_2/f$ = −0.1903 | $f_3/f$ = 0.496 | DO = 0.0152 |

EXAMPLE 20

| \multicolumn{4}{c}{f = 1  1:5 angle of field = 25.2° β = −0.12343} |
|---|---|---|---|
| R1 = 0.298 | D1 = 0.188 | N1 = 1.72 | ν1 = 50.2 |
| R2 = −1.3058 | D2 = 0.0778 | | |
| R3 = −0.2875 | D3 = 0.0574 | N2 = 1.80518 | ν2 = 25.4 |
| R4 = 0.3573 | D4 = 0.1482 | | |
| R5 = −0.5748 | D5 = 0.0653 | N3 = 1.60311 | ν3 = 60.7 |
| R6 = −0.4784 | D6 = 0.1083 | | |
| R7 = 1.1557 | D7 = 0.1496 | N4 = 1.697 | ν4 = 48.5 |
| R8 = −1.383 | D8 = 0.1051 | N5 = 1.72825 | ν5 = 28.5 |
| R9 = −1.6648 | D9 = 0.0158 | | |
| R10 = 0.7112 | D10 = 0.1017 | N6 = 1.7725 | ν6 = 49.6 |
| R11 = 2.7318 | | | |
| $|f_1f_2|$ = 1.8621 | $f_2/f$ = −0.1903 | $f_3/f$ = 0.5096 | DO = 0.0099 |

EXAMPLE 21

| \multicolumn{4}{c}{f = 1  1:5 angle of field = 25.2° β = −0.12343} |
|---|---|---|---|
| R1 = 0.4133 | D1 = 0.1413 | N1 = 1.72 | ν1 = 50.2 |
| R2 = −2.4883 | D2 = 0.1479 | | |
| R3 = −0.4097 | D3 = 0.0848 | N2 = 1.80518 | ν2 = 25.4 |
| R4 = 0.5148 | D4 = 0.1134 | | |
| R5 = −0.5332 | D5 = 0.1512 | N3 = 1.60311 | ν3 = 60.7 |
| R6 = −0.4298 | D6 = 0.1092 | | |
| R7 = 1.1578 | D7 = 0.1559 | N4 = 1.697 | ν4 = 48.5 |
| R8 = −2.0472 | D8 = 0.1053 | | |
| R9 = 0.9246 | D9 = 0.0956 | N5 = 1.7725 | ν5 = 49.6 |
| R10 = −24.8952 | D10 = 0.1017 | N6 = 1.80518 | ν6 = 25.4 |
| R11 = 2.4866 | | | |
| $|f_1/f_2|$ = 1.8463 | $f_2/f$ = −0.2722 | $f_3/f$ = 0.5321 | DO = 0.0079 |

Ternary aberration coefficients of the above examples are given in the following table, Table 2 wherein I is spherical aberration, II is coma, III is astigmatism, P is Petzval sum and V is distortion.

TABLE 2

| coefficient | Example | | | |
|---|---|---|---|---|
| | Example 13 | Example 14 | Example 15 | Example 16 |
| I | 0.02847 | −0.08302 | 0.06864 | −0.3336 |
| II | 0.09015 | 0.1896 | 0.15269 | 0.49706 |
| III | −0.00516 | −0.00769 | −0.01428 | 0.12913 |
| P | 0.14767 | 0.21517 | 0.19111 | 0.13869 |
| V | 0.18112 | 0.01496 | 0.0142 | −0.0607 |
| | Example 17 | Example 18 | Example 19 | Example 20 |
| I | 0.15339 | 0.09436 | 0.13221 | 0.15643 |
| II | 0.09323 | 0.10385 | 0.2282 | 0.17737 |
| III | −0.01272 | 0.00036 | 0.17019 | 0.07046 |
| P | 0.25299 | 0.25626 | 0.07882 | 0.11143 |
| V | 0.14735 | 0.20489 | 0.20353 | 0.12851 |
| | Example 21 | | | |

TABLE 2-continued

| coefficient | Example |
|---|---|
| I | 0.0236 |
| II | 0.15886 |
| III | −0.03366 |
| P | 0.24261 |
| V | −0.02899 |

What I claim is:

1. A telecentric projection lens comprising:
  a first lens component composed of a single lens of positive refractive power;
  a second lens component composed of a bi-concave lens of negative refractive power; and
  a third lens component including at least two positive lenses one having a cemented surface whose center of curvature is spaced from the surface towards the object field side, said first, second and thrid lens components being arranged in the recited order as viewed from the object field side and satisfying the conditions:

$$1.69 \leq |f_1/f_2| \leq 2.55$$

$$-0.33 \leq f_2/f \leq -0.19$$

$$0.41 \leq f_3/f \leq 0.59$$

wherein $f_1$, $f_2$ and $f_3$ are focal lengths of said first, second and third lens components, respectively, and f is the focal length of the whole lens system.

2. A telecentric projection lens as set forth in claim 1, wherein the surface of the object field side of the lens of said first lens component is convex toward the object field side, and wherein the two positive lenses of said third lens component are spaced apart to form an air lens element which is bi-concave.

3. A telecentric projection lens comprising:
  a first lens component composed of a single lens of positive refractive power;
  a second lens component composed of a bi-concave lens of negative refractive power; and
  a third lens component composed of three lenses one having a cemented surface, said first, second and third lens components being arranged in the recited order as viewed from the object field side and satisfying the following conditions:

$$1.72 \leq |f_1/f_2| \leq 2.58$$

$$-0.33 \leq f_2/f \leq -0.19$$

$$0.41 \leq f_3/f \leq 0.59$$

wherein, $f_1$, $f_2$ and $f_3$ are focal lengths of said first, second and third lens components, respectively, and f is the focal length of the whole lens system.

4. A telecentric projection lens as set forth in claim 3, wherein the nearest surface to the object field side of the lens of said first lens component is convexed toward the object field side.

5. A telecentric projection lens as set forth in claim 4, wherein the nearest lens of said third lens component to the object field side is a meniscus lens whose concave surface faces the object field side and the nearest lens of said tnird lens component to the image field side is a meniscus lens whose concave surface faces the image field side.

6. A telecentric projection lens comprising:
- a first lens component composed of a single lens of positive refractive power;
- a second lens component composed of a bi-concave lens of negative refractive power; and
- a third lens component composed of four lenses one having a cemented surface, said first, second and third lens components being arranged in the recited order as viewed from the object field side and satisfying the following conditions:

$$1.72 \leq |f_1/f_2| \leq 2.58$$

$$-0.33 \leq f_2/f \leq 0.19$$

$$0.41 \leq f_3/f \leq 0.59$$

wherein, $f_1$, $f_2$ and $f_3$ are focal lengths of said first, second and third lens components, respectively, and $f$ is the focal length of the whole lens system.

7. A telecentric projection lens set forth in claim 6, wherein the nearest surface to the object field side of the lens of said first lens component is convexed toward the object side.

8. A telecentric projection lens as set forth in claim 7, wherein the nearest lens of said third lens component to the object field side is a meniscus lens element whose concave surface faces the object field side and the nearest lens of said third lens component to the image field side is a meniscus lens element whose concave surface faces the image field side.

* * * * *

UNITED STATES PATENT AND TRADEMARK OFFICE
CERTIFICATE OF CORRECTION

PATENT NO. : 4,441,792

DATED : April 10, 1984

INVENTOR(S) : MASAMICHI TATEOKA

It is certified that error appears in the above-identified patent and that said Letters Patent is hereby corrected as shown below:

COLUMN 4

Line 54, before "double" insert --a--.

COLUMN 5

Line 7, "0.12343" should read -- -0.12343 --.

Line 40, "1.674" should read --1.697--.

COLUMN 8

Line 22, "produces" should read --produce--.

Line 27, "$f_1/f_2$" should read --$f_2/f$--.

Line 36, insert --the-- before "Petzval".

Line 41, insert --the-- before "telecentric--.

Line 62, insert --the-- before "object".

Line 64, insert --the-- before "Petzval".

COLUMN 9

Line 8, insert --the-- before "object".

Line 27, "thichness" should read --thickness--.

Line 56, "$\Gamma$" should read --$\beta$--.

COLUMN 10

Line 38, "$\Gamma$" should read --$\beta$--.

UNITED STATES PATENT AND TRADEMARK OFFICE
CERTIFICATE OF CORRECTION

PATENT NO. : 4,441,792
DATED : April 10, 1984
INVENTOR(S) : MASAMICHI TATEOKA

It is certified that error appears in the above-identified patent and that said Letters Patent is hereby corrected as shown below:

<u>CLAIM 1</u>

Line 9, "thrid" should read --third--.

<u>CLAIM 5</u>

Line 5, "tnird" should read --third--.

Signed and Sealed this

Thirteenth Day of November 1984

[SEAL]

Attest:

GERALD J. MOSSINGHOFF

Attesting Officer    Commissioner of Patents and Trademarks